United States Patent
Khubani et al.

(10) Patent No.: US 10,933,815 B1
(45) Date of Patent: Mar. 2, 2021

(54) APPARATUS FOR HOLDING MOBILE DEVICE

(71) Applicant: DaVinci II CSJ, LLC, Fairfield, NJ (US)

(72) Inventors: Ajit Khubani, Saddle River, NJ (US); Paul Dowd, Scarsdale, NY (US)

(73) Assignee: Da Vinci II CSJ, LLC, Fairfield, NJ (US)

( * ) Notice: Subject to any disclaimer, the term of this patent is extended or adjusted under 35 U.S.C. 154(b) by 0 days.

(21) Appl. No.: 16/781,808

(22) Filed: Feb. 4, 2020

(51) Int. Cl.
- *B60R 11/02* (2006.01)
- *H04M 1/04* (2006.01)
- *B60R 11/00* (2006.01)

(52) U.S. Cl.
CPC ........... *B60R 11/0241* (2013.01); *H04M 1/04* (2013.01); *B60R 2011/0075* (2013.01)

(58) Field of Classification Search
CPC ............. B60R 11/0241; B60R 11/0252; B60R 11/0258; B60R 2011/0059; B60R 2011/0075; B60R 2011/0084; B60R 2011/0085; F16M 11/043; F16M 13/00; F16M 13/022
See application file for complete search history.

(56) References Cited

U.S. PATENT DOCUMENTS

| | | |
|---|---|---|
| D323,504 S | 1/1992 | Langton |
| 5,230,016 A | 7/1993 | Yasuda |
| 5,305,381 A | 4/1994 | Wang et al. |
| 5,457,745 A | 10/1995 | Wang |
| 5,560,578 A * | 10/1996 | Schenken ............. B60N 3/101 248/229.21 |
| 5,568,549 A | 10/1996 | Wang |

(Continued)

FOREIGN PATENT DOCUMENTS

| CN | 303019916 S | 12/2014 |
|---|---|---|
| CN | 303032847 S | 12/2014 |

(Continued)

OTHER PUBLICATIONS

Cellet Universal 360 Adjustable Cup Holder Mount, Hands Free Automobile Cradle Compatible with Apple iPhone 11/11 Pro Xs Max XR 8 Plus, Galaxy S10 S10e S10Plus, S9 S9Plus Note 9, GPS. (PH600) found at https://www.amazon.com/Cellet-Adjustable-Automobile-Compatible-PH600/dp/B07RPPB5JK.

(Continued)

*Primary Examiner* — Jinsong Hu
*Assistant Examiner* — Rui M Hu
(74) *Attorney, Agent, or Firm* — Wolf, Greenfield & Sacks, P.C.

(57) ABSTRACT

A mount for a mobile device is configured to include a base assembly configured to be inserted into the cup holder. The base assembly is configured to adjust its size to be complementary to cup holders of any of various sizes. For example, the base assembly may include multiple curved sections, each curved section including an exterior surface forming a periphery of the base assembly, and the base assembly is arranged such that the curved sections move away from each other when a knob is rotated in a first direction, and move towards each other when the knob is rotated in a second direction, thereby adjusting the diameter of the periphery of the base assembly.

13 Claims, 20 Drawing Sheets

(56) References Cited

U.S. PATENT DOCUMENTS

| | | | |
|---|---|---|---|
| 5,588,055 A | 12/1996 | Williamson et al. | |
| D379,463 S | 5/1997 | Richter | |
| 5,694,468 A | 12/1997 | Hsu | |
| 5,697,071 A | 12/1997 | Fan | |
| D388,795 S | 1/1998 | Richter | |
| D390,849 S | 2/1998 | Richter et al. | |
| 5,745,565 A | 4/1998 | Wakefield | |
| 5,788,202 A | 8/1998 | Richter | |
| 5,825,874 A | 10/1998 | Humphreys et al. | |
| 5,836,563 A | 11/1998 | Hsin-Yung | |
| D402,666 S | 12/1998 | Golder | |
| D407,408 S | 3/1999 | Hoff | |
| 5,903,645 A | 5/1999 | Tsay | |
| 5,907,796 A | 5/1999 | Matchett et al. | |
| 5,996,866 A | 12/1999 | Susko et al. | |
| 6,062,518 A * | 5/2000 | Etue | B60R 11/0241 224/542 |
| 6,085,113 A | 7/2000 | Fan | |
| 6,097,810 A | 8/2000 | Hirai et al. | |
| 6,113,049 A * | 9/2000 | Miljanich | B60N 3/103 248/311.2 |
| 6,185,302 B1 | 2/2001 | Rytkönen et al. | |
| 6,189,755 B1 | 2/2001 | Wakefield | |
| D439,116 S | 3/2001 | White | |
| 6,246,766 B1 | 6/2001 | Walsh | |
| 6,267,340 B1 | 7/2001 | Wang | |
| 6,285,758 B1 | 9/2001 | Lu | |
| 6,315,153 B1 | 11/2001 | Osborn | |
| D451,504 S | 12/2001 | Edwards | |
| D452,236 S | 12/2001 | Kohli | |
| 6,366,672 B1 | 4/2002 | Tsay | |
| 6,396,925 B1 | 5/2002 | Close | |
| 6,427,959 B1 | 8/2002 | Kalis et al. | |
| 6,478,276 B1 | 11/2002 | Louh | |
| 6,543,637 B1 | 4/2003 | Osborn | |
| D478,073 S | 8/2003 | Topinka | |
| 6,726,267 B2 | 4/2004 | Kim et al. | |
| 6,789,773 B2 | 9/2004 | Holland | |
| D499,092 S | 11/2004 | Fan | |
| 6,832,745 B2 | 12/2004 | Lindsay | |
| 6,902,142 B1 | 6/2005 | Cheng | |
| 6,944,294 B2 | 9/2005 | Tsay | |
| 6,959,899 B2 | 11/2005 | Yeh | |
| 7,017,243 B2 | 3/2006 | Carnevali | |
| D524,807 S | 7/2006 | Topinka | |
| 7,080,812 B2 | 7/2006 | Wadsworth et al. | |
| 7,099,466 B2 | 8/2006 | Walsh | |
| 7,099,467 B1 | 8/2006 | Rohrbach | |
| D529,905 S | 10/2006 | Richter | |
| D530,713 S | 10/2006 | Richter | |
| 7,140,586 B2 * | 11/2006 | Seil | B60R 11/00 248/311.2 |
| D535,988 S | 1/2007 | Kettula et al. | |
| 7,158,092 B2 | 1/2007 | Shen | |
| 7,162,281 B2 | 1/2007 | Kim | |
| 7,194,087 B2 | 3/2007 | Luginbill et al. | |
| 7,219,867 B2 | 5/2007 | Kalis et al. | |
| 7,251,324 B2 | 7/2007 | Richter | |
| 7,272,984 B2 | 9/2007 | Fan | |
| 7,328,876 B2 | 2/2008 | Jones | |
| D566,118 S | 4/2008 | Brassard | |
| 7,380,759 B1 * | 6/2008 | Whiteside | B60R 11/02 248/183.1 |
| 7,389,964 B2 | 6/2008 | Ye | |
| 7,407,143 B1 | 8/2008 | Chen | |
| 7,413,155 B2 | 8/2008 | Seil et al. | |
| 7,422,184 B2 | 9/2008 | Carnevali | |
| 7,505,583 B2 | 3/2009 | Rohrbach | |
| 7,523,528 B2 | 4/2009 | Carnevali | |
| 7,537,190 B2 * | 5/2009 | Fan | B60R 11/02 248/309.1 |
| 7,540,459 B2 | 6/2009 | Asano et al. | |
| 7,551,458 B2 | 6/2009 | Carnevali | |
| 7,571,522 B2 | 8/2009 | Carnevali | |
| 7,597,301 B2 | 10/2009 | Seil et al. | |
| 7,611,114 B1 | 11/2009 | Griffin | |
| 7,614,595 B2 | 11/2009 | Richter | |
| D606,065 S | 12/2009 | Rihu | |
| 7,647,676 B2 | 1/2010 | Carnevali | |
| D610,353 S | 2/2010 | Cooney et al. | |
| 7,668,306 B2 | 2/2010 | Strathmeyer et al. | |
| 7,668,309 B2 | 2/2010 | Wilcox et al. | |
| 7,708,247 B2 | 5/2010 | Lota | |
| 7,712,720 B1 | 5/2010 | Cheng et al. | |
| D625,715 S | 10/2010 | Adams, II | |
| 7,823,844 B2 | 11/2010 | Carnevali | |
| 7,857,178 B2 | 12/2010 | Brown, Jr. | |
| 7,925,320 B2 | 4/2011 | Pemble et al. | |
| 7,954,773 B2 * | 6/2011 | Carnevali | B60N 3/101 248/160 |
| 7,967,269 B2 | 6/2011 | Liu | |
| 8,027,465 B2 | 9/2011 | Rohrbach | |
| 8,061,670 B1 * | 11/2011 | White | B60R 11/02 248/311.2 |
| 8,074,951 B2 | 12/2011 | Carnevali | |
| 8,091,850 B2 | 1/2012 | Carnevali | |
| 8,176,603 B2 | 5/2012 | Carnevali | |
| 8,202,114 B2 | 6/2012 | Zilmer et al. | |
| 8,262,070 B2 | 9/2012 | Liu | |
| 8,376,301 B2 | 2/2013 | Fan | |
| 8,378,790 B2 | 2/2013 | Ryoo et al. | |
| 8,382,059 B2 | 2/2013 | Le Gette et al. | |
| 8,393,584 B2 | 3/2013 | Burns | |
| 8,424,825 B2 | 4/2013 | Somuah | |
| D685,379 S | 7/2013 | Richter | |
| D685,380 S | 7/2013 | Richter | |
| 8,490,937 B2 | 7/2013 | Crain et al. | |
| 8,550,410 B2 | 10/2013 | Fraser | |
| 8,567,737 B2 | 10/2013 | Chen | |
| 8,573,455 B1 | 11/2013 | Brown | |
| 8,576,557 B2 | 11/2013 | Chu | |
| 8,638,557 B2 | 1/2014 | Tsai | |
| 8,646,736 B2 | 2/2014 | Berry | |
| D705,211 S | 5/2014 | Huang | |
| 8,752,802 B1 | 6/2014 | Fan | |
| 8,757,572 B1 | 6/2014 | Starr et al. | |
| 8,777,173 B2 | 7/2014 | Nemoto | |
| 8,794,579 B2 | 8/2014 | Sturman et al. | |
| 8,827,341 B2 | 9/2014 | Sofield | |
| 8,833,716 B2 | 9/2014 | Funk et al. | |
| 8,857,687 B1 | 10/2014 | An | |
| 8,960,623 B2 | 2/2015 | Woolford | |
| 8,960,634 B2 | 2/2015 | Le Gette et al. | |
| 8,979,060 B1 | 3/2015 | Olsson et al. | |
| 9,004,434 B2 | 4/2015 | Kang et al. | |
| 9,038,971 B1 * | 5/2015 | Guthrie | F16M 11/40 248/121 |
| D732,013 S | 6/2015 | Aspinall et al. | |
| 9,062,820 B2 | 6/2015 | Allmendinger et al. | |
| 9,080,714 B2 | 7/2015 | Minn et al. | |
| 9,103,487 B2 | 8/2015 | Hale et al. | |
| 9,162,630 B2 | 10/2015 | Pluta | |
| 9,204,747 B1 | 12/2015 | Starr et al. | |
| 9,220,349 B1 * | 12/2015 | Cashin | F16B 2/04 |
| 9,267,638 B2 | 2/2016 | Le Gette et al. | |
| D752,571 S | 3/2016 | Richter | |
| 9,278,652 B1 | 3/2016 | Lundsgaard et al. | |
| 9,281,857 B1 | 3/2016 | Lundsgaard et al. | |
| 9,316,344 B2 | 4/2016 | Le Gette et al. | |
| 9,334,679 B2 | 5/2016 | Lin | |
| 9,360,154 B2 | 6/2016 | Le Gette et al. | |
| 9,408,456 B2 | 8/2016 | Hart | |
| D765,646 S | 9/2016 | Deng et al. | |
| D767,556 S | 9/2016 | Lee | |
| 9,448,588 B2 | 9/2016 | Barnard | |
| 9,468,122 B2 | 10/2016 | Woodward | |
| 9,470,358 B2 | 10/2016 | Le Gette et al. | |
| D772,217 S | 11/2016 | Alesi et al. | |
| D772,218 S | 11/2016 | Alesi et al. | |
| D772,859 S | 11/2016 | Alesi et al. | |
| D777,167 S | 1/2017 | Wengreen | |
| D777,720 S | 1/2017 | Russell | |
| 9,538,675 B2 | 1/2017 | Le Gette et al. | |

(56) References Cited

U.S. PATENT DOCUMENTS

| | | |
|---|---|---|
| 9,540,065 B2 | 1/2017 | Stageberg |
| 9,573,532 B2 | 2/2017 | Riddiford et al. |
| 9,581,291 B2 | 2/2017 | Trotsky |
| 9,609,105 B1 | 3/2017 | Krug et al. |
| D784,923 S | 4/2017 | Song |
| 9,616,822 B1 | 4/2017 | Hamilton et al. |
| 9,647,712 B2 | 5/2017 | Ryan et al. |
| 9,651,069 B2 | 5/2017 | Aspinall et al. |
| 9,689,527 B2 | 6/2017 | Franklin |
| 9,699,285 B1 | 7/2017 | Lundsgaard et al. |
| 9,710,016 B1 | 7/2017 | Porzio |
| D798,306 S | 9/2017 | Wengreen |
| 9,764,693 B1 | 9/2017 | Biondo |
| 9,797,543 B2 | 10/2017 | Lin |
| D803,208 S | 11/2017 | Cai |
| D803,674 S | 11/2017 | Carnevali |
| D804,286 S | 12/2017 | Rock et al. |
| D805,021 S | 12/2017 | Cunningham |
| D806,521 S | 1/2018 | Wengreen |
| 9,859,940 B1 | 1/2018 | Lundsgaard et al. |
| 9,888,104 B2 | 2/2018 | Uhlig et al. |
| 9,898,042 B2 | 2/2018 | Abbott |
| 9,902,336 B2 | 2/2018 | Lippold-Fritz et al. |
| 9,924,005 B1 | 3/2018 | McElderry |
| D816,076 S | 4/2018 | Ahn |
| D817,317 S | 5/2018 | Lee |
| D819,015 S | 5/2018 | Lee |
| D820,247 S | 6/2018 | Ahn |
| D820,248 S | 6/2018 | Ahn |
| D820,823 S | 6/2018 | Ahn |
| D821,290 S | 6/2018 | Jung |
| D821,291 S | 6/2018 | Jung |
| 10,001,153 B1 | 6/2018 | Fan |
| 10,005,404 B2 | 6/2018 | Lupsan et al. |
| D822,581 S | 7/2018 | Jung |
| D822,582 S | 7/2018 | Jung |
| D824,379 S | 7/2018 | Symons |
| D824,380 S | 7/2018 | Lee |
| 10,011,005 B2 | 7/2018 | Shute et al. |
| 10,026,535 B2 | 7/2018 | Bohannon |
| 10,038,829 B2 | 7/2018 | Gilbert |
| 10,065,570 B2 | 9/2018 | Dry et al. |
| 10,137,919 B2 | 11/2018 | Winton et al. |
| 10,150,426 B2 | 12/2018 | Ormsbee et al. |
| 10,155,482 B2 | 12/2018 | Corso |
| D838,107 S | 1/2019 | Daly et al. |
| 10,173,607 B1* | 1/2019 | Omelchenko ....... B60R 11/0241 |
| D839,868 S | 2/2019 | Lee |
| 10,576,905 B1* | 3/2020 | MacNeil ............ B60R 11/0241 |
| 2002/0049081 A1 | 4/2002 | Heininger |
| 2002/0094078 A1 | 7/2002 | Edwards |
| 2002/0094079 A1 | 7/2002 | Edwards |
| 2005/0236536 A1* | 10/2005 | Fan ......................... B60R 11/02 248/176.3 |
| 2005/0236545 A1* | 10/2005 | Seil ..................... B60R 11/0241 248/311.2 |
| 2006/0026807 A1 | 2/2006 | Carnevali |
| 2006/0278788 A1 | 12/2006 | Fan |
| 2007/0262223 A1 | 11/2007 | Wang et al. |
| 2007/0281619 A1* | 12/2007 | Chen ...................... B60R 11/02 455/42 |
| 2007/0284500 A1* | 12/2007 | Fan ......................... H04M 1/04 248/346.06 |
| 2009/0090757 A1 | 4/2009 | Kim et al. |
| 2009/0294617 A1 | 12/2009 | Stacey et al. |
| 2009/0308993 A1* | 12/2009 | Chang .................. F16M 13/005 248/176.3 |
| 2010/0295228 A1* | 11/2010 | Woody ............... B60R 11/0258 269/254 R |
| 2011/0148352 A1 | 6/2011 | Wang et al. |
| 2011/0233251 A1* | 9/2011 | Doig ..................... B60R 11/02 224/567 |
| 2012/0298708 A1 | 11/2012 | DeAngelo |
| 2013/0148273 A1* | 6/2013 | Tsai ........................ H04M 1/04 361/679.01 |
| 2014/0138419 A1* | 5/2014 | Minn ..................... F16B 2/065 224/567 |
| 2016/0167587 A1* | 6/2016 | Dry ......................... B60R 11/02 224/275 |
| 2017/0253150 A1* | 9/2017 | Wei ...................... B60N 2/2252 |
| 2018/0001835 A1* | 1/2018 | Corso ..................... H04M 1/04 |
| 2018/0215320 A1 | 8/2018 | Mendoza Vera et al. |
| 2019/0005936 A1 | 1/2019 | Smith et al. |
| 2019/0203879 A1* | 7/2019 | Lebedev ............. E05B 73/0082 |

FOREIGN PATENT DOCUMENTS

| | | |
|---|---|---|
| CN | 303143826 S | 3/2015 |
| CN | 303169400 S | 4/2015 |
| CN | 303479768 S | 12/2015 |
| CN | 303479811 S | 12/2015 |
| CN | 303479847 S | 12/2015 |
| CN | 303493247 S | 12/2015 |
| CN | 303493268 S | 12/2015 |
| CN | 303617931 S | 3/2016 |
| CN | 304221164 S | 7/2017 |
| CN | 304261521 S | 8/2017 |
| CN | 304394037 S | 12/2017 |
| CN | 304438110 S | 1/2018 |
| CN | 304540435 S | 3/2018 |
| CN | 304613491 S | 5/2018 |
| CN | 304717275 S | 7/2018 |
| CN | 305024679 S | 2/2019 |
| CN | 305049422 S | 2/2019 |
| CN | 305098623 S | 4/2019 |
| CN | 305136106 S | 4/2019 |
| CN | 305154786 S | 5/2019 |
| CN | 305160793 S | 5/2019 |
| CN | 305196317 S | 6/2019 |
| CN | 305227740 S | 6/2019 |
| CN | 305255743 S | 7/2019 |
| CN | 305342650 S | 9/2019 |
| CN | 305447262 S | 11/2019 |
| CN | 305498958 S | 12/2019 |
| CN | 305510228 S | 12/2019 |
| CN | 305510229 S | 12/2019 |
| CN | 305510244 S | 12/2019 |
| EM | 002030395-0003 | 4/2012 |
| EM | 002141721-0003 | 3/2013 |
| EM | 002775643-0001 | 9/2015 |
| EM | 003750728-0001 | 2/2017 |
| EM | 005809340-0002 | 10/2018 |
| EM | 006084463-0002 | 1/2019 |
| EM | 006312872-0001 | 4/2019 |
| EM | 006686689-0004 | 8/2019 |
| EM | 006686689-0007 | 8/2019 |
| JP | D1167342 | 3/2003 |
| JP | D1449150 | 8/2012 |
| KR | 300959905.0000 | 6/2018 |
| KR | 300978115.0000 | 10/2018 |

OTHER PUBLICATIONS

Car Cup Holder Phone Mount Adjustable Automobile Cup Holder Smart Phone Cradle Car Mount for iPhone 11 Pro/XR/XS Max/X/ 8/7 Plus/6s/Samsung S10+/Note 9/S8 Plus/S7 Edge(Grey) found at https://www.amazon.com/Upgraded-Holder-Adjustable-Automobile-Samsung/dp/B07V5SCF5K.

Adjustable Automobile Car Cup Holder Phone Mount with Longer Neck & 360° Rotatable Cradle found at https://www.walmart.com/ip/iPhone-Galaxy-G7-V40-V35-Max-Mount-Longer-Pro-6s-9-8-7-Phone-S10-S10E-S9-S8-Note-X-Neck-Plus-Cup-Automobile-Cradle-11-11-Holder-Adjustable-Rotatable-/395327334.

Arkon®—Robust Custom Car Cup Holder Phone Mount found at https://www.carid.com/arkon/arkon-robust-custom-car-cup-holder-phone-mount-2235989851.html.

Car Cup Holder Phone Mount Adjustable Portable Gooseneck car Phone H found at https://www.lelong.com.my/usa-car-cup-holder-phone-mount-adjustable-portable-gooseneck-car-phone-h-sallymarket04-F1692119-2007-01-Sale-I.htm.

(56) References Cited

OTHER PUBLICATIONS

Ram-Mount X-Grip Mount With Cup Holder Base for Cell Phones, GPS found at https://www.walcottradio.com/rammount-xgrip-mount-with-cup-holder-base-for-cell-phones-gps-p-2558.html.
Tuff Tech 23384 Heavy Cup Mount Magnetic Phone Holder found at https://www.amazon.com/Custom-Accessories-23384-Magnetic-Holder/dp/B01FHDVZC6/ref=pd_sbs_107_t_1/136-3115179-1835013?encoding=UTF8&pd_rd_i=B01FHDVZC6&pd_rd_r=033fc1cd-3612-4471-9132-01c8ffbab09a&pd_rd_w=2K0xG&pd_rd_wg=ZSkiA&pf_rd_p=5-cfcfe89-300f-47d2-b1ad-a4e27203a02a&pf_rd_r=9JFBNQ4M749M2GMN60N4&psc=1&refRID=9JFBNQ4M749M2GMN60N4.
Wireless MQOUNY Wireless Accessory Wireless Car Charger,MQOUNY Cup Holder Phone Mount,Phone Holder Car Charger Cup Phone-Holder Fast Charging Compatible with iPhone 11/11Pro Max/XR/Xs Max/Xs/8, Samsung Galaxy Note 10 (Black) found at https://www.wantitall.co.za/wireless/wireless-car-charger-mqouny-cup-holder-phone-mount-phone-holder-car-charger-cup-phone-holder-fast-ch__b07z3crftl.
Car Cup Holder Phone Mount GPED Universal Adjustable Automobile Phone Cradle with 360° Rotatable found at https://www.savesoo.com/review-product/95953-Car-Cup-Holder-Phone-Mount-GPED-Universal-Adjustable-Automobile-Phone-Cradle-amazon-freebies.
Cellet Universal Car Cup Holder Mount for Apple IPhone Xr Xs Max X 8 8 Plus 7+ Samsung Note 10 9 8 Galaxy S10+ S9 S9PLUS S8 S8 Plus LG G7 G6 V30 Q7+ Stylo 4 V35 Moto G6 X4 Extra Long Goose-Neck found at https://www.ubuy.co.in/search/index/view/product/B07LB6TG36/s/cellet-universal-car-cup-holder-mount-for-apple-iphone-xr-xs-max-x-8-8-plus-7-samsung-note-10-9-8-galaxy-s10-s9-s9plus-s8-s8-plus-lg-g7-g6-v30-g7-stylo-4-v35-moto-g6-x4-extra-long-goose-neck/store/store?amp=true.
Macally Adjustable Automobile Cup Holder Phone Mount for iPhone Xs XS Max XR X 8 8+ 7 7 Plus 6s Plus 6s SE Samsung Galaxy S10 S10E S9 S9+ S8 S7 Edge S6 Note 5, Xperia, iPod, Smartphone, GPS (MCUPMP) found at https://www.amazon.com/gp/product/B007GNNH3Q/ref=oh_aui_detailpage_o05_s00?ie=UTF8&psc=1.
Capdase Racer Mount photo.

* cited by examiner

APPARATUS FOR HOLDING MOBILE DEVICE

TECHNICAL FIELD

This disclosure generally relates to an apparatus for holding a mobile device. A portion of the apparatus (e.g., a base assembly) can be inserted into a cup holder (e.g., in a vehicle).

BACKGROUND

In recent years, technological improvements have enabled mobile devices (such as smartphones, tablets, personal digital assistants, etc.) to be used in almost any environment. Such mobile devices typically include a display and are configured via applications to allow users to access assorted functionalities. For example, the mobile device may have a map and/or navigation application that is very useful to a user on-the-go. On the other hand, if the user is operating a vehicle, the user may wish to not be holding the device, due to legal restrictions or practical concerns.

Many designs of a mobile phone holder have been proposed, but most are configured to be attached to air vents in a vehicle. Such holders permit the mobile phone to be held in a fixed orientation that is not necessarily useful in every circumstance nor to every user, and does not permit the user to adjust the orientation of the mobile phone held by the holder, as desired. Further, the phone blocks the flow of air through the air vent.

Other phone holders have been proposed that would be permanently attached via an adhesive or removably attached via suction cups and the like, to the dashboard or another surface of the vehicle. However, the former arrangement (i.e. via adhesive) is not suitable for replacement of the holder, and the latter arrangements (i.e. via suction cups and the like) do not reliably adhere to the surface.

Recently, phone holders that are configured to be fitted to a cup holder in a vehicle have been proposed. However, the arrangements proposed are typically not adaptable for use with cup holders of arbitrary sizes, nor are such arrangements user-friendly.

There remains a need for a user-friendly and reliable arrangement to securely mount a mobile device in a vehicle.

SUMMARY

A mount for a mobile device may be configured to be inserted in a cup holder. The mount can include a mobile device holder to hold the mobile device; a base assembly configured to be inserted into the cup holder, the base assembly comprising: plural curved sections, each curved section including an exterior surface forming a periphery of the base assembly and an interior surface; a first conical element including a sloped surface contacting an upper portion of the interior surface of the curved sections; and a second conical element opposing the first conical element and including a sloped surface contacting a lower portion of the interior surface of the curved sections. The mount can further include a neck assembly; a rotatable knob coupled to the mobile device holder via the neck assembly, the curved sections of the base assembly being configured to move away from each other when the knob is rotated in a first direction and move towards each other when the knob is rotated in a second direction, to adjust the diameter of the periphery of the base assembly and enable the base assembly to be inserted into cup holders of any of plural sizes; and a threaded barrel coupling the knob to the first conical element and configured to move upwards or downwards as the knob is rotated. The rotation of the knob in the first direction may cause the sloped surface of each of the first conical element and the second conical element to slide against respective sloped surfaces of the interior surface of the curved sections, as the first conical element and the second conical element move towards each other, to expand the diameter of the periphery of the base assembly.

In some embodiments, the rotation of the knob in the second direction causes the sloped surface of each of the first conical element and the second conical element to slide against respective sloped surfaces of the interior surface of the curved sections, as the first conical element and the second conical element move away from each other, to narrow the diameter of the periphery of the base assembly.

In one or more embodiments, the mount further includes a guide shaft coupled to the threaded barrel and extending from a top portion of the knob to a bottom portion of the second conical element, the guide shaft being configured to prevent the threaded barrel from rotating when the knob is rotated and to guide and hold the second conical element when the knob is rotated.

In one or more embodiments, the mount further includes a rod extending from a first end disposed above a top portion of the knob to a second end disposed at an under portion of the second conical element, the rod being configured to resist forces applied to the base assembly when the knob is rotated, each of the first end and the second end of the rod having a 90° bend; and a locking element disposed at the under portion of the second conical element and surrounding the second end of the rod, to securely lock the rod in place. The first end of the rod may be disposed in a housing of the neck assembly.

In one or more embodiments, the neck assembly includes a pivot coupled to a back portion of the holder to enable roll adjustment of the mobile device holder. A connector part of the neck assembly can comprise the pivot and a sector gear, the sector gear cooperating with a tooth portion of a spring included in the neck assembly to enable pitch adjustment of the mobile device holder.

In one or more embodiments, the mobile device holder includes a resting portion to receive the mobile device, and first and second side clamps configured to clamp first and second sides of the mobile device, respectively, the first and second side clamps being movable towards and away from the resting portion to securely hold mobile devices of any of plural sizes, and a release button which when actuated causes the first and second side clamps to move away from each other to release the mobile device from the mobile device holder.

In one or more embodiments, the mobile device holder includes a first spring to cause the first and second side clamps to move away from each other when the release button is activated.

In one or more embodiments, the mobile device holder further comprises a gear and a pinion which cooperates with the release button, and each of the first and second clamps include a rack portion which cooperates with the pinion to enable the first and second clamps to move towards or away from each other.

In one or more embodiments, a mount for a mobile device can be configured to be inserted in a cup holder, and the mount includes a mobile device holder to hold the mobile device; a base assembly configured to be inserted into the cup holder, the base assembly comprising: plural curved sections, each curved section including an exterior surface forming a periphery of the base assembly and an interior surface; a first element including a first surface complementary to an upper portion of the interior surface of the curved sections; and a second element opposing the first element and including a second surface complementary to a lower portion of the interior surface of the curved sections. The mount can further include a neck assembly; a rotatable knob coupled to the mobile device holder via the neck assembly, the curved sections of the base assembly being configured to move away from each other when the knob is rotated in a first direction and move towards each other when the knob is rotated in a second direction, to adjust the diameter of the periphery of the base assembly and enable the base assembly to be inserted into cup holders of any of plural sizes; and a threaded barrel coupling the knob to the first element and configured to move upwards or downwards as the knob is rotated. The rotation of the knob in the first direction can cause the first surface of the first element to slide against the complementary surface of the upper portion of the interior surface of the curved section and can cause the second surface of the second element to slide against the complementary surface of the lower portion of the interior surface of the curved section, as the first element and the second element move towards each other, to expand the diameter of the periphery of the base assembly.

In one or more embodiments, a bottom portion of the first element is complementary to a top portion of the second element.

In one or more embodiments, wherein the rotation of the knob in the second direction causes the first surface of the first element to slide against the complementary surface of the upper portion of the interior surface of the curved section and causes the second surface of the second element to slide against the complementary surface of the lower portion of the interior surface of the curved section, as the first element and the second element move away from each other, to narrow the diameter of the periphery of the base assembly.

In one or more embodiments, the mount further comprises a guide shaft coupled to the threaded barrel and extending from a top portion of the knob to a bottom portion of the second element, the guide shaft being configured to prevent the threaded barrel from rotating when the knob is rotated and to guide and hold the second element when the knob is rotated.

In one or more embodiments, the mount further comprises a rod extending from a first end disposed above a top portion of the knob to a second end disposed at an under portion of the second element, the rod being disposed and configured to resist forces applied to the base assembly when the knob is rotated, each of the first end and the second end of the rod having a 90° angle bend; and a locking element disposed at the under portion of the second element and surrounding the second end of the rod, to securely lock the rod in place. The first end of the rod may be disposed in a housing of the neck assembly.

In one or more embodiments, the neck assembly includes a pivot coupled to a back portion of the holder to enable roll adjustment of the mobile device holder. A connector part of the neck assembly may comprise the pivot and a sector gear, the sector gear cooperating with a tooth portion of a spring included in the neck assembly to enable pitch adjustment of the mobile device holder.

In one or more embodiments, the mobile device holder includes a resting portion to receive the mobile device, and first and second side clamps configured to clamp first and second sides of the mobile device, respectively, the first and second side clamps being movable towards and away from the resting portion to securely hold mobile devices of any of plural sizes, and a release button which when actuated causes the mobile device to be released from the first and second side clamps.

In one or more embodiments, a mount for a mobile device can be configured to be inserted in a cup holder, and the mount comprises a mobile device holder a mobile device holder to hold the mobile device; a base assembly that is configured to be inserted into the cup holder, the base assembly including plural sub-members each including an exterior surface forming a periphery of the base assembly and an interior surface; and means for translating plural sub-members of the base assembly to cause the plural sub-members to move away from each other in a first operation, to expand the diameter of the periphery of the base assembly, and to cause the plural sub-members to move towards each other in a second operation, to narrow the diameter of the periphery of the base assembly, to allow for adjustment of the diameter of the periphery of the base assembly and enable the base assembly to be inserted into cup holders of any of plural sizes.

BRIEF DESCRIPTION OF THE DRAWINGS

FIG. 11A shows a partial view (including rod, base of neck assembly, knob, guide shaft and upper and lower elements of base assembly) of the apparatus, in a closed position, shown in

FIG. 10;

DETAILED DESCRIPTION

Figure 1:
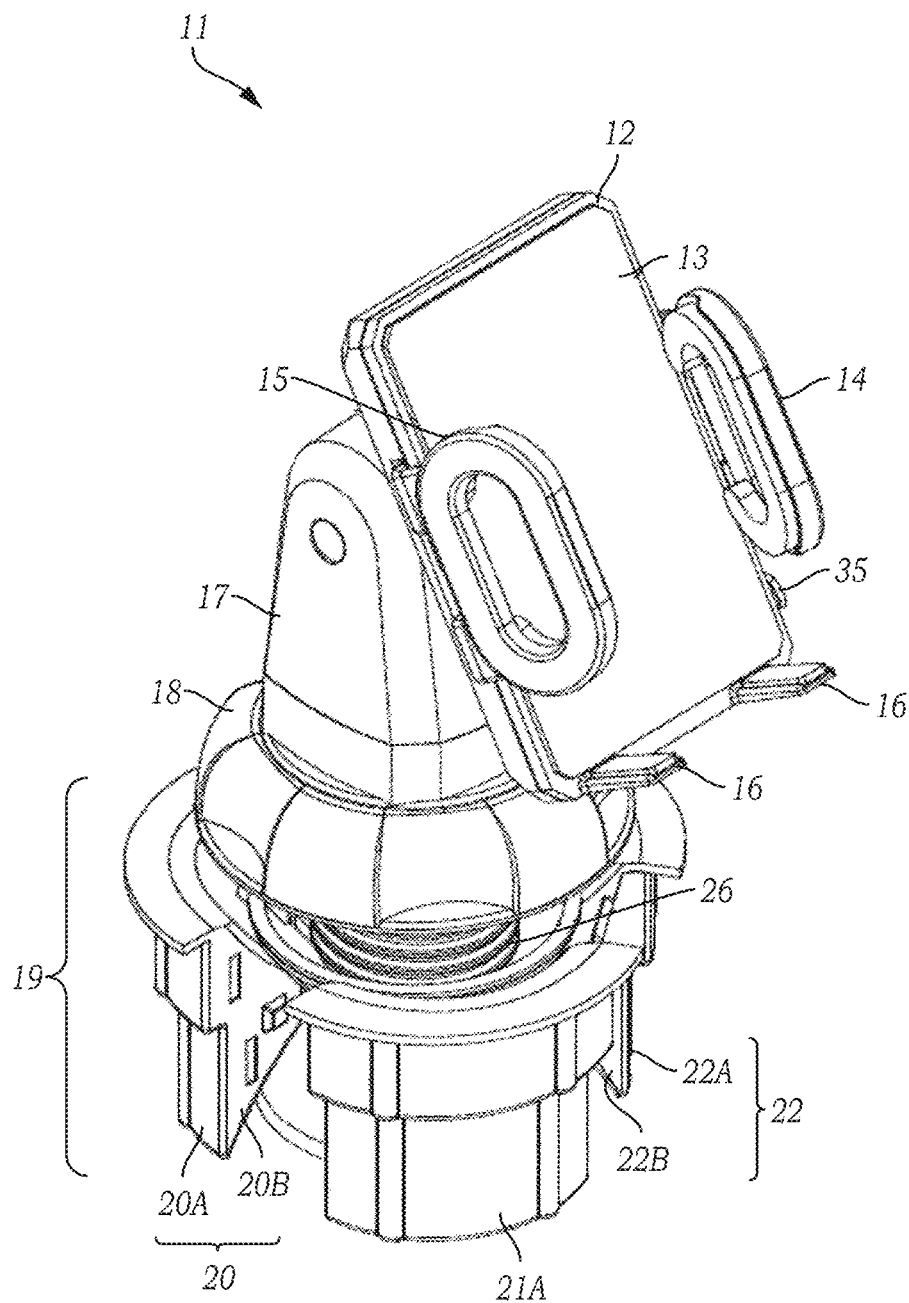
FIG. 1 shows a perspective view of an apparatus for holding a mobile device, according to an embodiment.

The following embodiments and examples (including details thereof) are set forth to aid in an understanding of the subject matter of this disclosure but are not intended to, and should not be construed to, limit in any way the invention that is claimed. In describing examples and preferred embodiments illustrated in the drawings, specific terminology is employed for the sake of clarity in this patent specification. However, this disclosure is not intended to be limited to the specific terminology so selected and it is to be understood that each specific element includes all technical equivalents that operate in a similar manner. In addition, a detailed description of known functions and configurations will be omitted when it may obscure the subject matter of the present disclosure. In the description below, like reference numerals are used to describe the same, similar or corresponding parts in the several views of the drawing.

Figure 2:
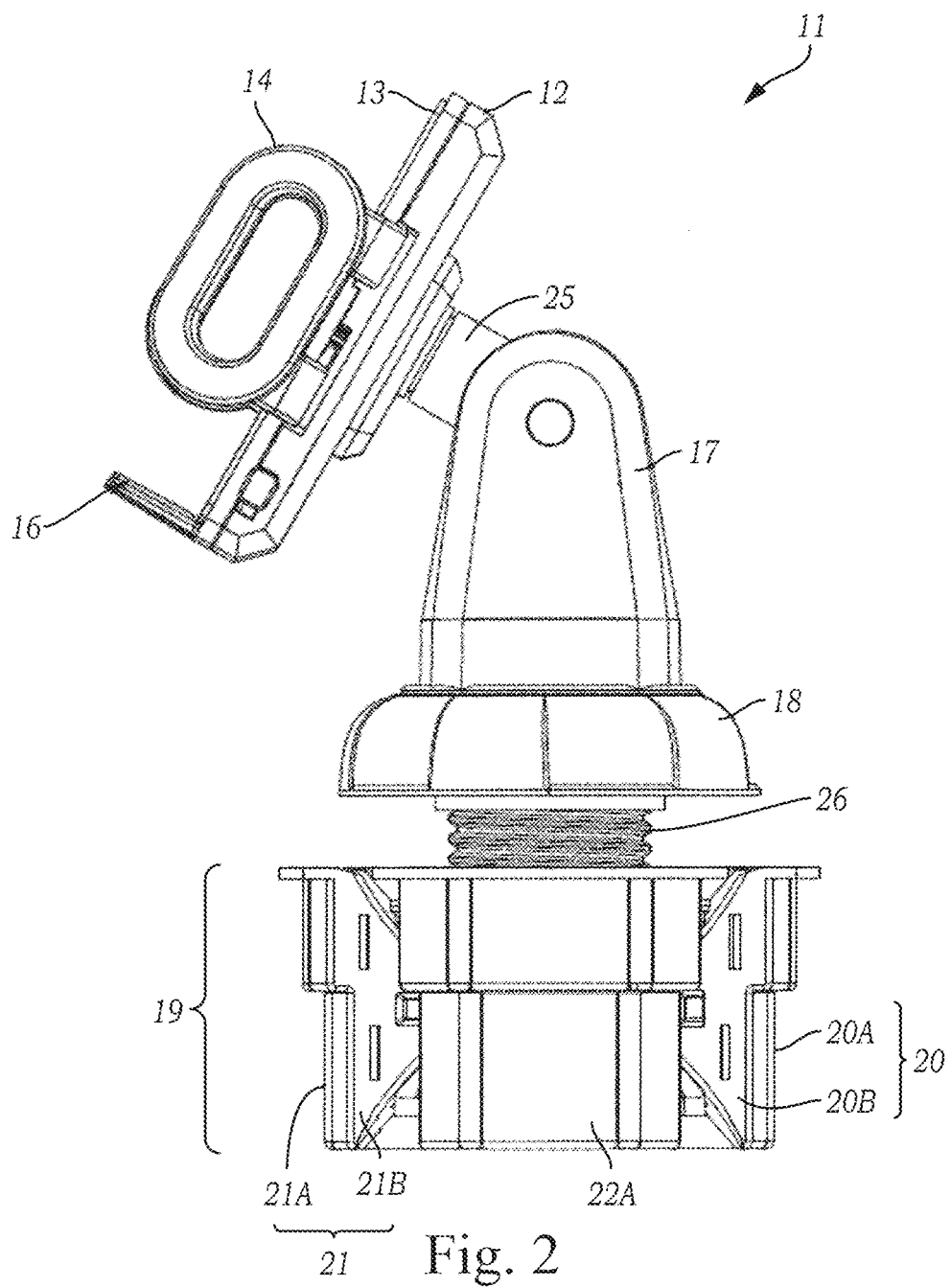
FIG. 2 shows a side view of the apparatus shown in FIG. 1.
Figure 3:
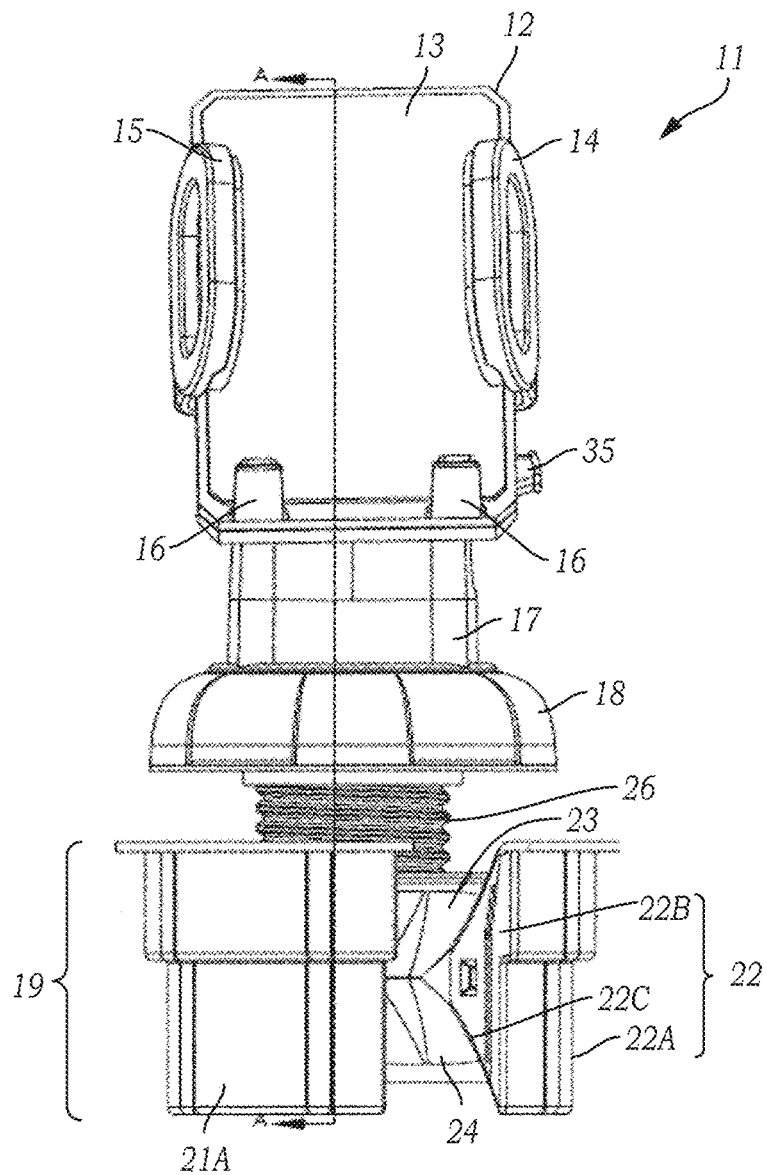
FIG. 3 shows a front view of the apparatus shown in FIG. 1.
Figure 4:
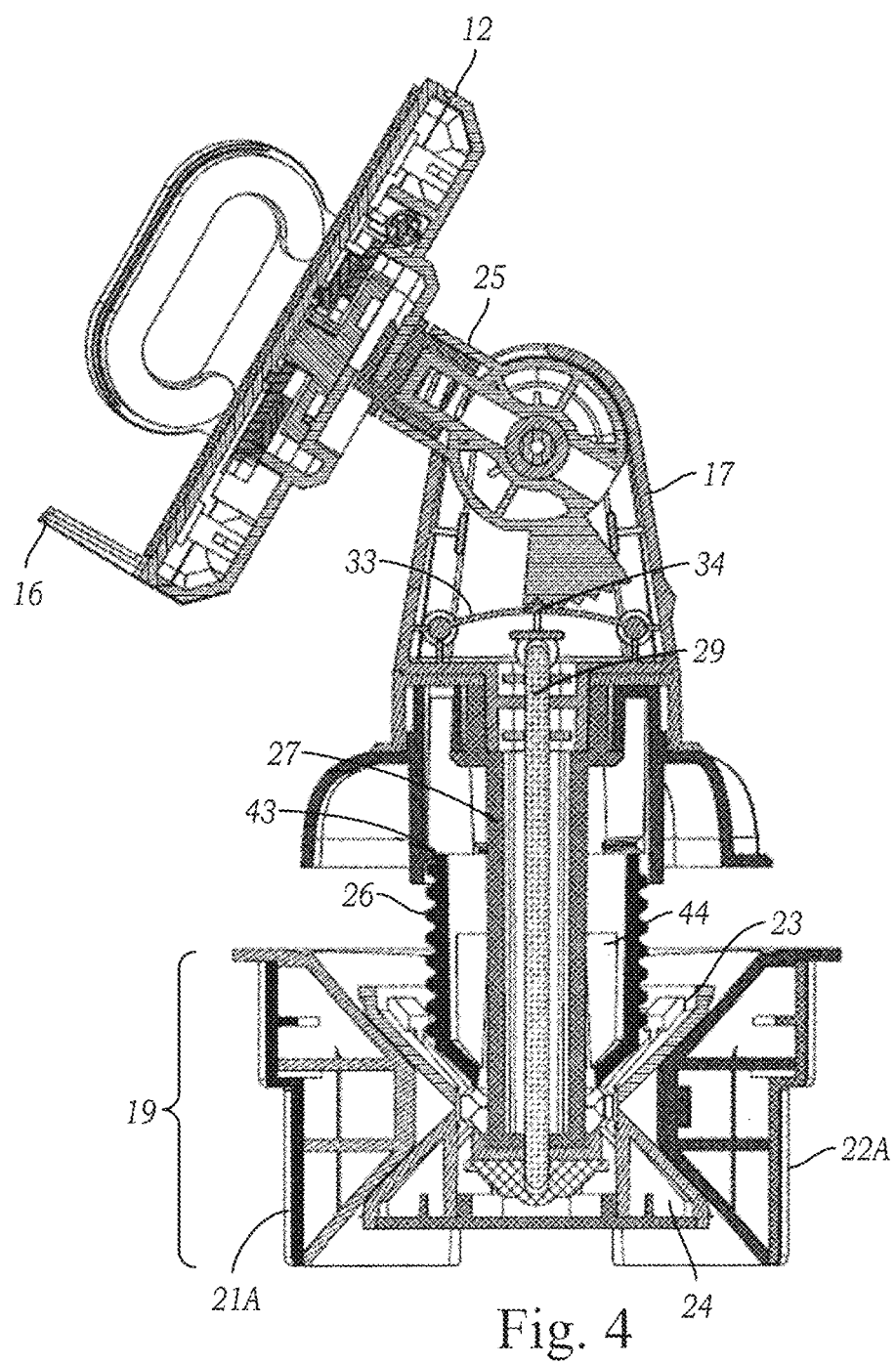
FIG. 4 shows a cross-sectional view of the apparatus, along line A-A shown in FIG. 3.

Mount 11, as shown in the example of FIGS. 1-3, includes holder 12 which can include resting portion 13 configured to receive mobile devices (e.g., smartphones, tablets, notebook computers) of various sizes and dimensions, and side clamps 14, 15 configured to clamp first and second sides of the mobile device, respectively. Mount 11 can further include neck assembly 17, knob 18, and base assembly 19. The base assembly 19 can be configured to be adjustable by the user to conveniently fit into any size cup holder (e.g., in a land vehicle or watercraft). For example, it may be desirable to provide a larger cupholder in an SUV (Sport utility vehicle) than in a sedan, or a larger cupholder in the front seat of a vehicle, such as a cupholder for adults, than in the back seat of the vehicle, such as a cupholder for children, and the base assembly 19 can be adjusted to be inserted int the cupholder in any of such instances. When secured in the cupholder, the mount 11 can enable a user (e.g., driver of or passenger the vehicle) to mount the mobile device in an upright position to facilitate hands-free speaking during a telephone call, use of a global-positioning system (GPS) feature on the mobile device, or to utilize any number of other features of the mobile device.

The resting portion 13 can include foam padding to cushion a back portion of the mobile device, and the side clamps 14, 15 can include foam padding to cushion the side portions of the mobile device. The side clamps 14, 15 are configured to be movable towards and away from (e.g., in a transverse direction) the resting portion 13 (e.g., expanding up to 3.5" wide), in order to accommodate mobile devices of various sizes and dimensions (including in a case that a mobile device is equipped with a protective case or accessory which may itself be of various sizes and dimensions). For example, the side clamps 14, 15 may be adjustable by a user (e.g., by squeezing the side clamps 14, 15 towards sides of the mobile device to lock the mobile device in place), to enable a particular mobile device (including any protective case or accessory) to fit between the side clamps 14, 15. The holder 12 can further include a release button 35, which when actuated can cause the side clamps 14, 15 to move away from each other to release the mobile device from the holder 12. The holder 12 can also include platforms 16, and a bottom portion of the mobile device can rest on the platforms 16 when the mobile device is inserted into the holder 12. The platforms 16 can be spaced apart on the holder 13 to enable a wire (e.g., a charging cable, headphones) to be inserted between the platforms 16 and into the mobile device while the mobile device is mounted in mount 11. The platforms 16 optionally can each include a foam padding to cushion a bottom of the mobile device.

Figure 5:
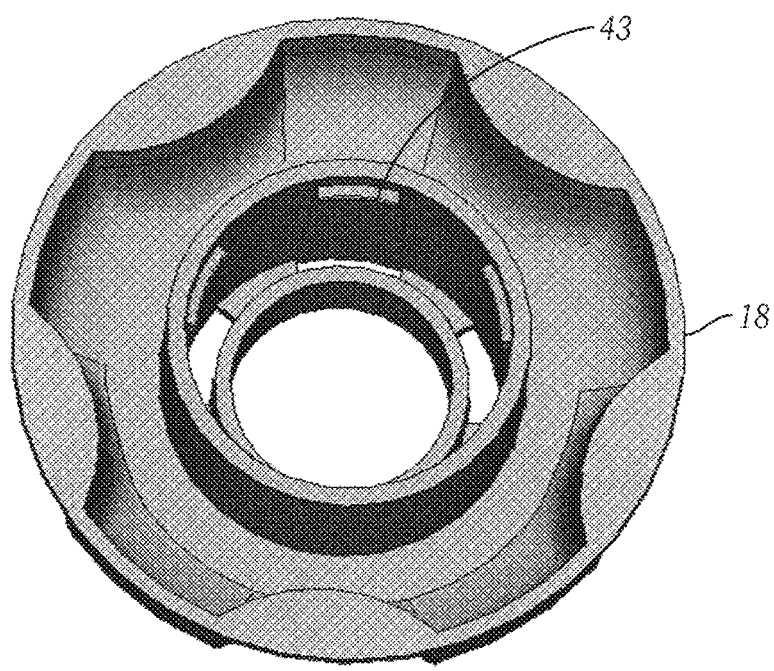
FIG. 5 shows a bottom view of a knob of the apparatus shown in FIG. 1.

As shown in FIGS. 1-5, the knob 18 can act as a nut, e.g., can be twisted and rotated by the user to clamp and un-clamp the base assembly 19, to cause the base assembly 19 to expand and contract, to alternate between an open position and a closed position. The knob 18 can be disposed above the base assembly 19, and can be disposed between the base assembly 19 and the neck assembly 17, and can be coupled to the holder 12 via the neck assembly 17. The knob 18 may have a curved outer periphery, and the outer periphery can be divided into one or more curved outer portions, and every other divided portion may optionally be indented at a lower portion thereof (e.g., to allow a user to conveniently grip the knob 18 while rotating the knob 18). As shown in FIG. 5, the knob 18 can also include an inner portion having a diameter that is narrower than the diameter of the curved outer periphery, and the inner portion can be configured to receive, in a slot extending along a longitudinal axis of the inner portion, threaded barrel 26, which in turn may include a slot extending along a longitudinal axis of the threaded barrel 26 to receive a guide shaft 27. The inner portion can include one or more notches 43 to engage with threads of the threaded barrel 26, such that the notches 43 may be disposed between threads in an indentation of the threaded barrel, during rotation of the knob 18.

As shown in FIGS. 1-3, base assembly 19 configured to be inserted in a cup holder can include plural sub-elements 20, 21, 22, which may be curved elements to conform to a conventional curved cupholder in a vehicle. The sub-elements 20, 21, 22 can include exterior curved portions 20A, 21A, 22A forming a periphery of the base assembly 19 and interior surfaces 20B, 21B, 22B, respectively. The base assembly 19 also includes upper element 23 and lower element 24 disposed at an interior of the base assembly 19, to contact interior portions 20B, 21B, 22B, and upper element 23 can be disposed above lower element 24. Although base assembly 19 is shown having three sub-elements 20, 21, 22, one of ordinary skill in the relevant art would appreciate that the base assembly 19 is not limited to an arrangement having three sub-elements 20, 21, 22, and could include other amounts of plural sub-elements.

As shown in FIGS. 4, 6, 7A-7C and 12, the upper element 23 can each include an opening at a center portion thereof to receive the threaded barrel 26 therethrough, and the threaded barrel can be directly coupled (e.g., screwed or otherwise fastened) to the upper element 23. For example, a bottom portion of each of the threaded barrel 26 and the upper element 23 can include one or more screw holes configured to receive fasteners to couple the threaded barrel 26 to the upper element 23, or the upper element 23 can include one or more notches disposed at side portions thereof to abut against and grip the threaded portions of threaded barrel 26. Guide shaft 27 can extend from above the knob 18 to below an underside of the lower element 24, and can extend through a slot along the longitudinal axis of the threaded barrel 26 and through an opening at a center portion of the lower element 24. Guide shaft 27 can be configured to guide and hold the lower element 24, such as by being secured to the lower element 24 by virtue of rod 29 extending through the guide shaft 27 to an underside of the lower element 24, and a locking element 28 secured a second end 29b of the rod 29 to the base assembly 19.

Figure 13:
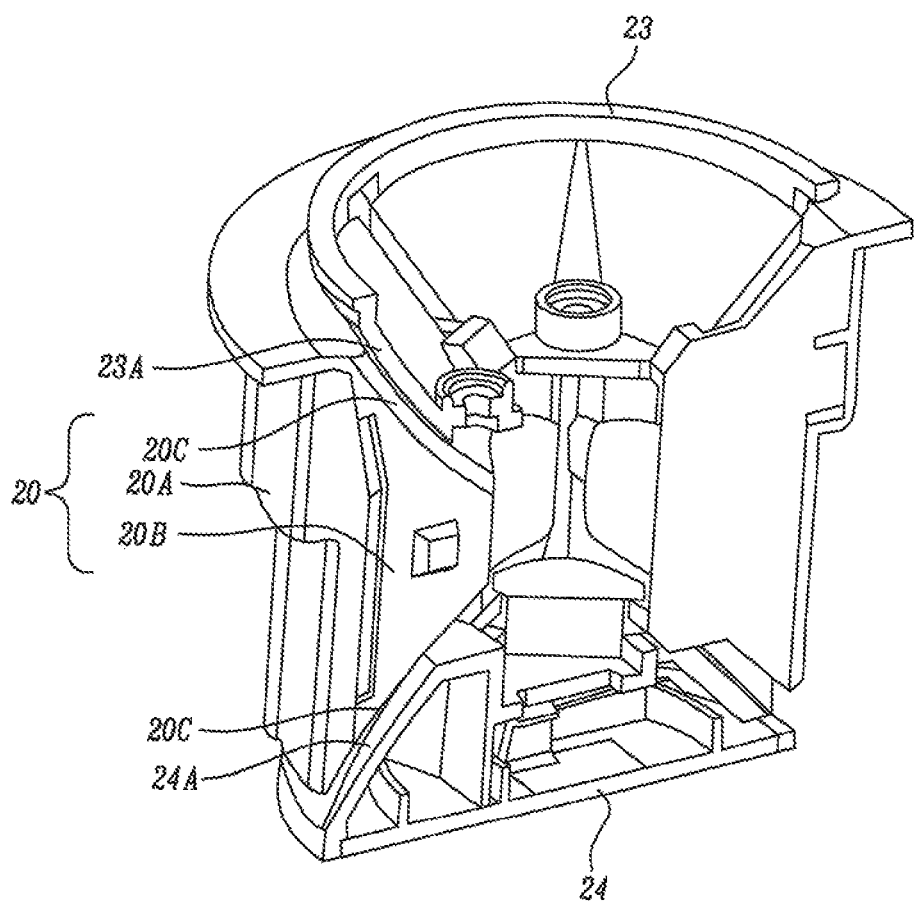
FIG. 13 shows a partial view (including upper and lower elements of base assembly and sub-elements of the base assembly) of the apparatus, in a closed position, shown in FIG. 10.

The guide shaft 27 can be configured to prevent threaded barrel 26 from rotating with the knob 18, to enable threaded barrel 26, when the knob 18 is rotated, to instead rise upwards and downwards along a longitudinal axis of the guide shaft 27, rather than rotate with the knob 18. Various arrangements may be employed to, for example, block rotation of the threaded barrel 26 when the knob 18 is rotated, and transmit torque generated by the rotation of the knob 18 to the threaded barrel 26 in the form of linear motion, to enable the threaded barrel 26 to slide along the longitudinal axis of the guide shaft 27. For example, rod 29 extends through the guide shaft 27 to an underside of the lower element 24 holds the base assembly 19 together, to resist forces applied to the base assembly 19 when the knob 18 is rotated, and as shown in FIG. 13, one or more fins 44 disposed at an interior portion of the threaded barrel 26 can be disposed at an angle to contact and hold guide shaft 27, which remains fixed during rotation of the knob 18. When the knob 18 is rotated, the guide shaft 27 inhibits rotation of the threaded barrel 26 with the knob 18, while permitting the threaded barrel 26 is permitted to be translated, and the notches 43 of the knob 18 can engage with the threaded portions of threaded barrel 26 as the threaded barrel moves upwards and downwards along a longitudinal axis of the guide shaft 27.

Figure 6:
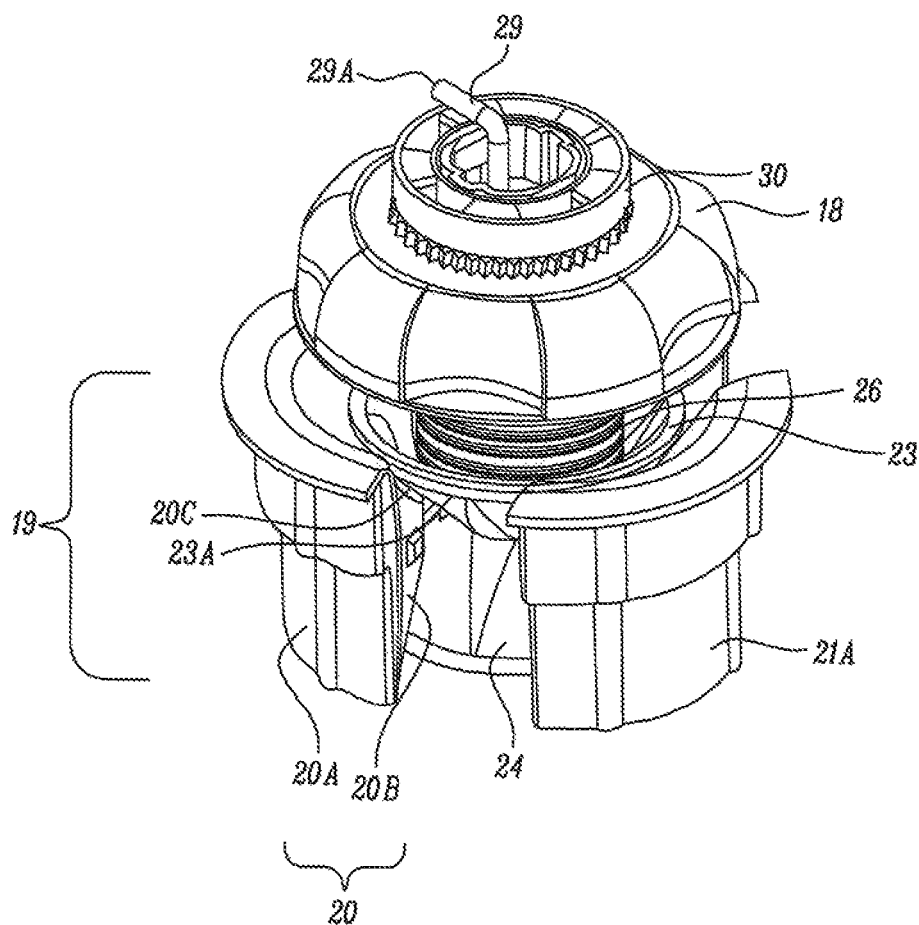
FIG. 6 shows a partial, perspective view (including rod, base of neck assembly, knob, threaded barrel and base assembly) of the apparatus, in an open position, shown in FIG. 1.

When the base assembly 19 is in the open position (FIGS. 6-8), the threaded barrel 26 can extend from just above a bottom of the knob 18 to just above a bottom portion of upper element 23. As the threaded barrel 26 can be directly coupled to the upper element 23, the downward movement of the threaded barrel 26, as the knob 18 is rotated and the base assembly moves from the closed position to the open position, causes the upper element 23 to move towards the lower element 24. When the knob 18 is rotated in a first direction (e.g., one of clockwise or counter-clockwise), a first surface 23A of the upper element 23 can be configured to slide against a complementary surface 20C, 21C, 22C of an upper portion of the interior surface 20B, 21B, 22C of the corresponding sub-element 20, 21, 22, and a second surface 24A of the lower element 24 can be configured to slide against a complementary surface 20C, 21C, 22C of a lower portion of the interior surface 20B, 21B, 22C of the corresponding sub-element 20, 21, 22, as the upper and lower elements 23, 24 move towards each other, to cause a diameter of the periphery of the base assembly to expand (FIG. 6).

Figure 9:
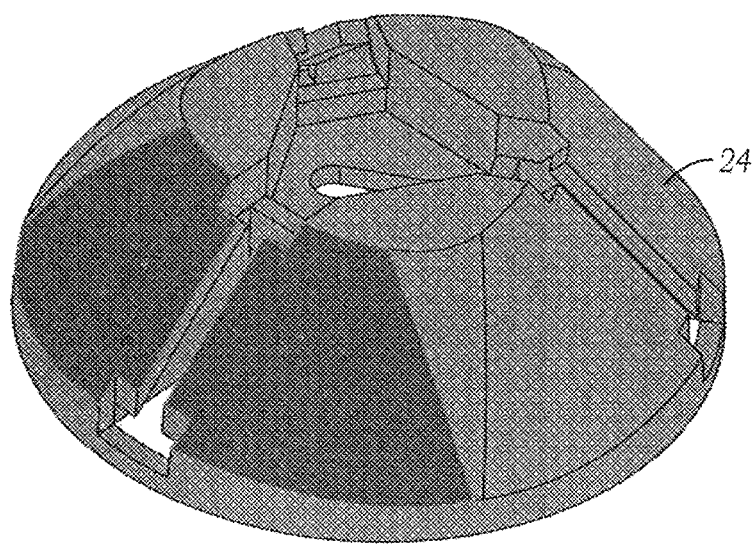
FIG. 9 shows a view of a lower element of the base assembly of the apparatus, in an open position, shown in FIG. 1.
Figure 10:
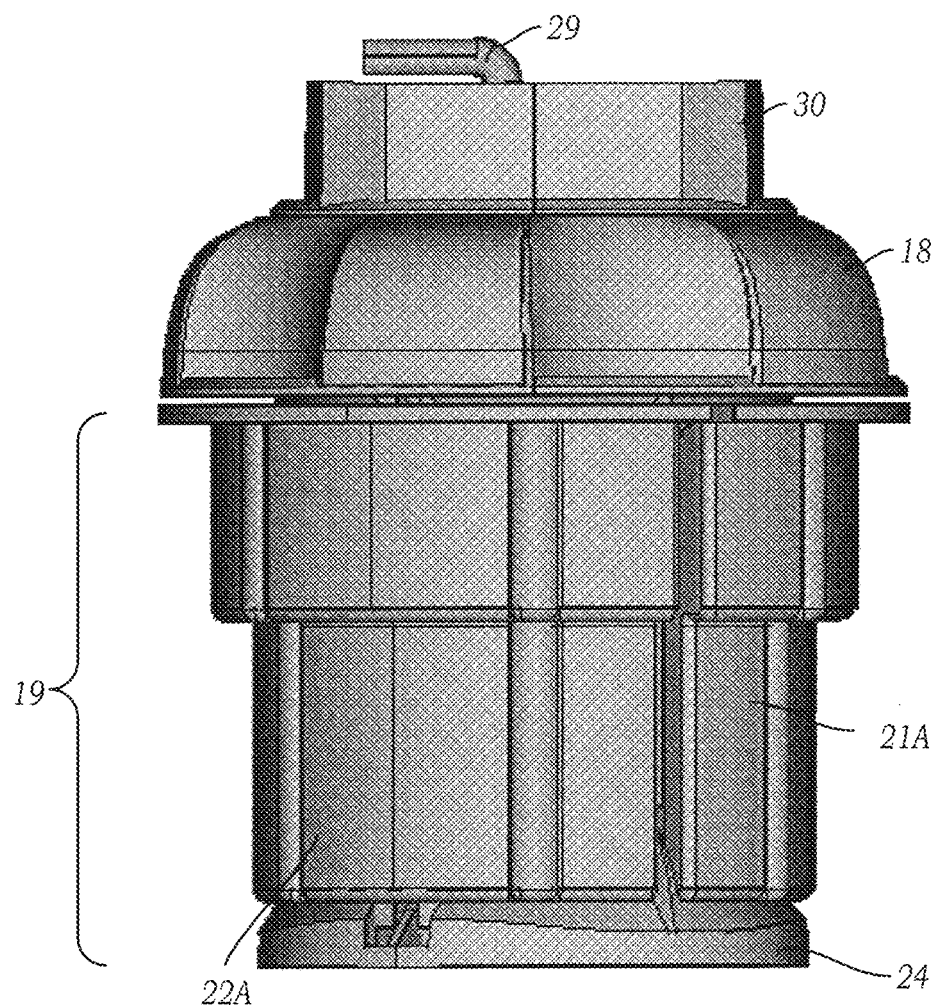
FIG. 10 shows a partial, front view (including rod, base of neck assembly, sub-elements of the base assembly and lower element of the base assembly) of the apparatus shown in FIG. 1, in a closed position.

As shown in FIG. 9, the upper element 23 and lower element 24 can be conical elements, for example. The upper element 23 and the lower element 24 can alternatively be, for example, tetrahedron, triangle, pyramidal or frustrum-shaped, or any shape which complements the interior portion of the base assembly sub-elements 20, 21, 22 to enable sliding of the upper element 23 and the lower element 24 against the interior portion of the base assembly sub-elements 20, 21, 22. Further, it is preferable that a bottom portion of the upper element 23 is complementary to a top portion of the lower element 24 (e.g., to interface with each other when the base assembly is moved to the open position). The upper and lower elements 23, 24 can be configured to have plural sloped surfaces to be complementary with the interior portions of the base assembly sub-elements 20, 21, 22.

Figure 7A:
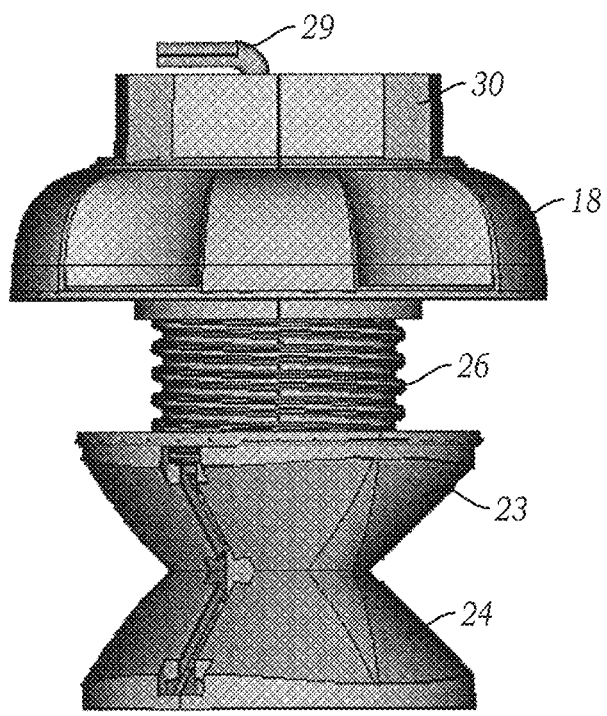
FIG. 7A shows a partial view (including rod, base of neck assembly, knob, threaded barrel and upper and lower elements of base assembly) of the apparatus, in an open position, shown in FIG. 6.
Figure 7B:
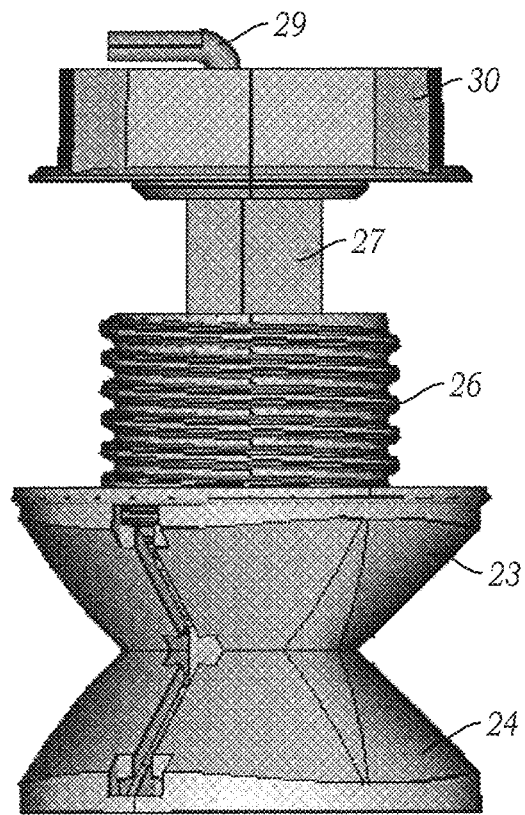
FIG. 7B shows a partial view (including rod, base of neck assembly, guide shaft, threaded barrel, and upper and lower elements of base assembly) of the apparatus, in an open position, shown in FIG. 6.
Figure 7C:
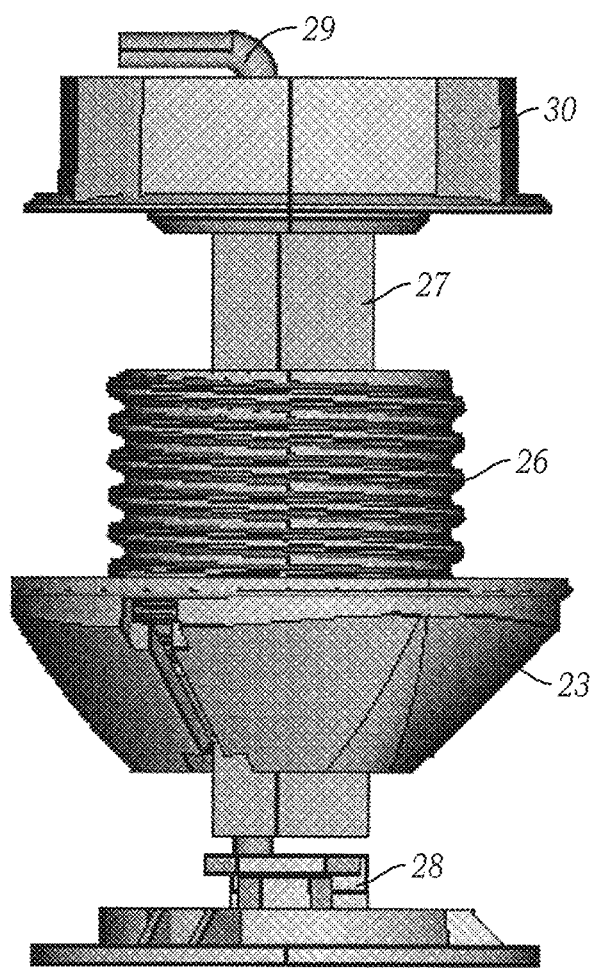
FIG. 7C shows a partial view (including rod, base of neck assembly, guide shaft, threaded barrel, upper element of base assembly and locking element) of the apparatus, in an open position, shown in FIG. 6.
Figure 8:
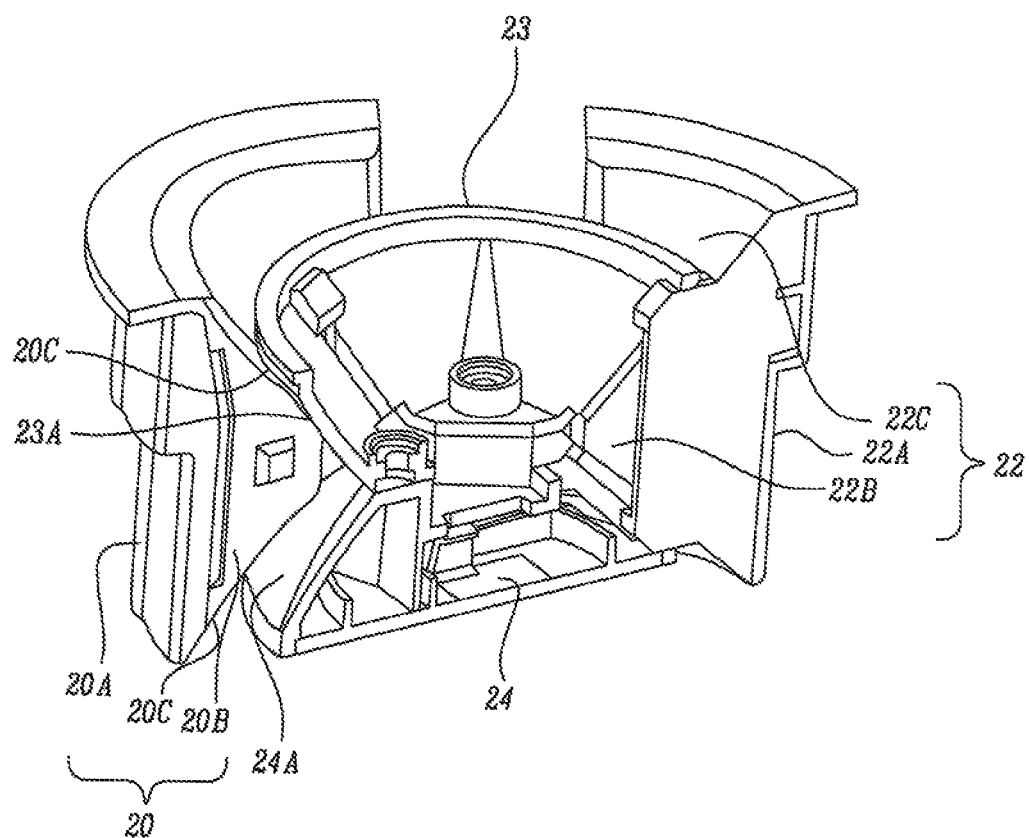
FIG. 8 shows a partial view (including upper and lower elements of base assembly and sub-elements of the base assembly) of the apparatus shown in FIG. 6.
Figure 11A:
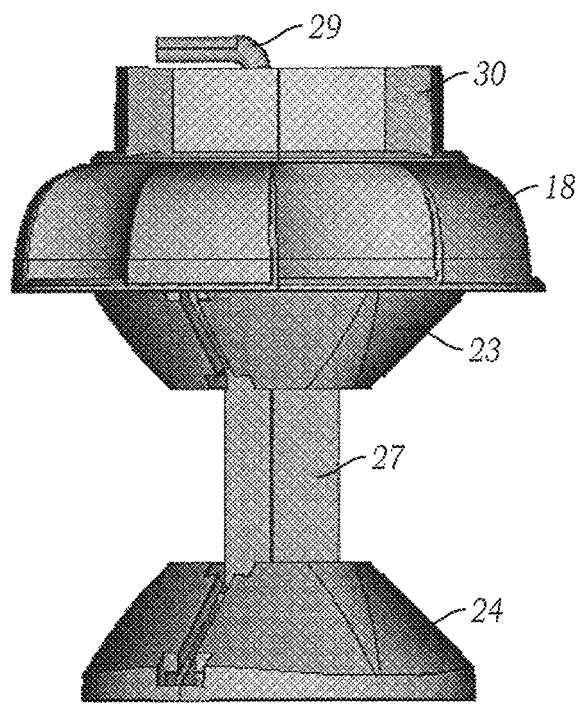
Figure 11B:
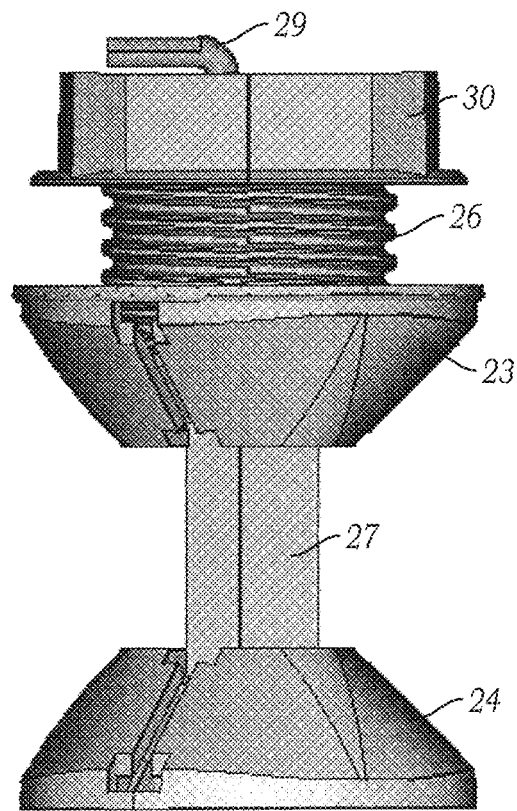
FIG. 11B shows a partial view (including rod, base of neck assembly, guide shaft, threaded barrel, and upper and lower elements of base assembly) of the apparatus, in a closed position, shown in FIG. 10.
Figure 11C:
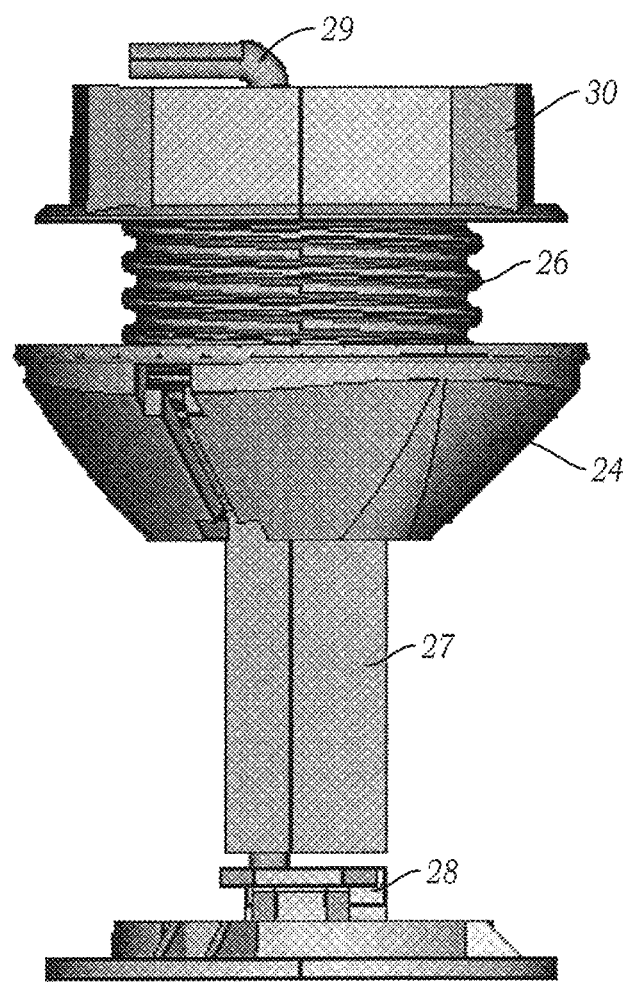
FIG. 11C shows a partial view (including rod, base of neck assembly, guide shaft, threaded barrel, upper element of base assembly and locking element) of the apparatus, in a closed position, shown in FIG. 10.
Figure 12:
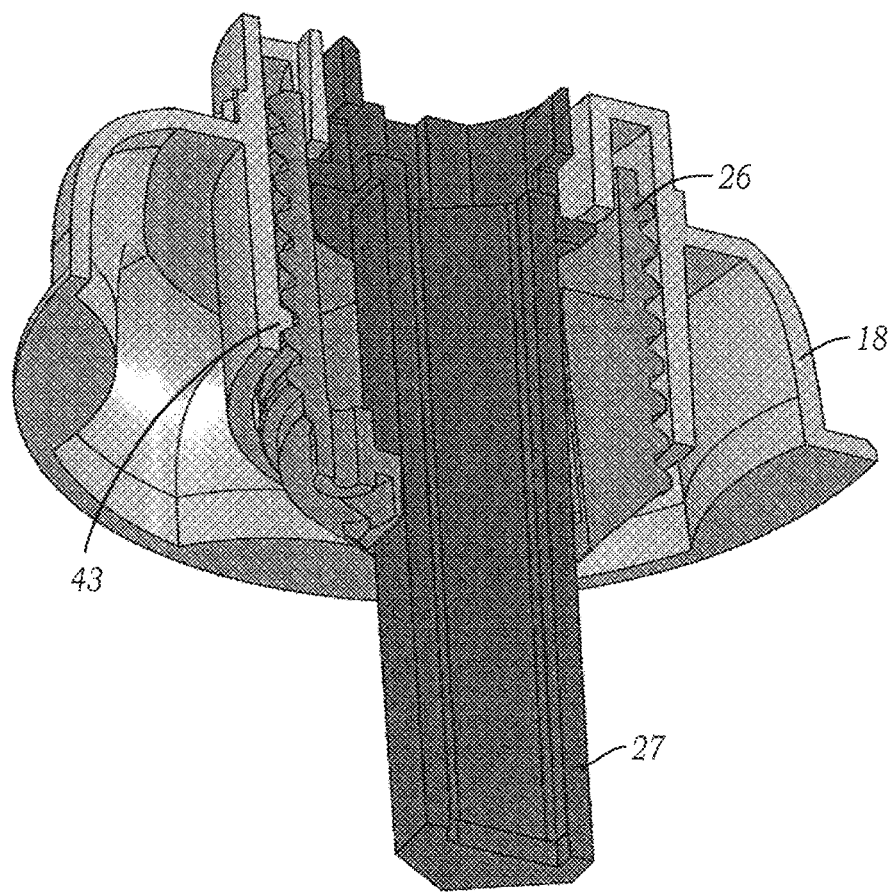
FIG. 12 shows a partial, upwards perspective view (including knob, guide shaft, threaded barrel) of the apparatus, in a closed position, shown in FIG. 10.

When the base assembly 19 is in the closed position (FIGS. 10-13), threaded barrel 26 extends from just below a top portion of the guide shaft 27, through which the first end 29A of rod 29 extends, to a bottom portion of the upper element 23, which is spaced apart from the lower element 24. That is, for the base assembly to move from the open position (as shown in FIGS. 7A-7C) to the closed position (as shown in FIGS. 11A-11C), the threaded barrel 26 has moved upwards, which causes the upper element 23 to be spaced apart from the lower element 24 along the longitudinal axis of the guide shaft 27, and the base assembly sub-elements 20, 21, 22 to move towards each other in a contracted position. In such operation, when the knob 18 is rotated in a second direction (e.g., the other of clockwise or counter-clockwise), a first surface 23A of the upper element 23 can be configured to slide against a complementary surface 20C, 21C, 22C of an upper portion of the interior surface 20B, 21B, 22C of the corresponding sub-element 20, 21, 22, and a second surface 24A of the lower element 24 is configured to slide against a complementary surface 20C, 21C, 22C of a lower portion of the interior surface 20B, 21B, 22C of the corresponding sub-element 20, 21, 22, as the upper and lower elements 23, 24 move away each other, to cause the diameter of the periphery of the base assembly to narrow (FIG. 13).

The base assembly 19 is configured to cause the upper element 23 and the lower element 24 to move closer and together and further away from each other, in order to adjust the diameter of the periphery of the base assembly. It should be noted that a user can optionally rotate the knob 18 to an intermediate position (e.g., any position in between the base assembly 19 being in an extreme open position and the base assembly 19 being in an extreme closed position), as appropriate for the dimensions of the cupholder. As can be appreciated as those of skill in the relevant art, means for translating plural sub-members of the base assembly can constitute any combination of knob 18, base assembly 19, threaded barrel 26, guide shaft 27, locking element 28, and rod 29, and equivalents thereof.

Figure 14:
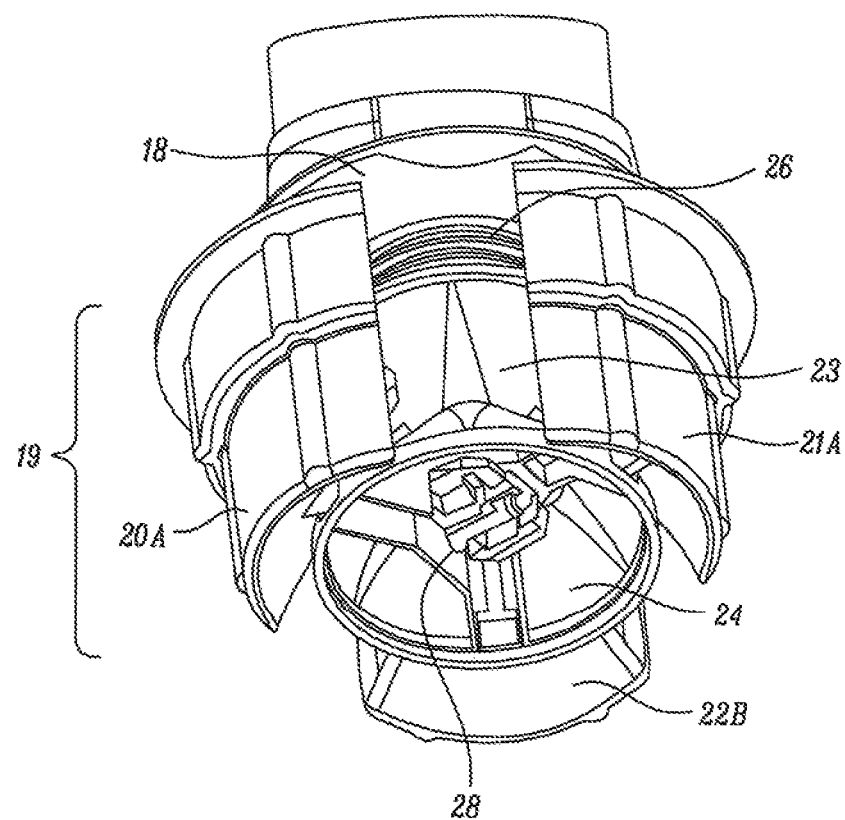
FIG. 14 shows a partial, upwards perspective view (including knob, threaded barrel, upper and lower elements of base assembly, sub-elements of base assembly and locking element) of the apparatus, in an open position, shown in FIG. 1.
Figure 15:
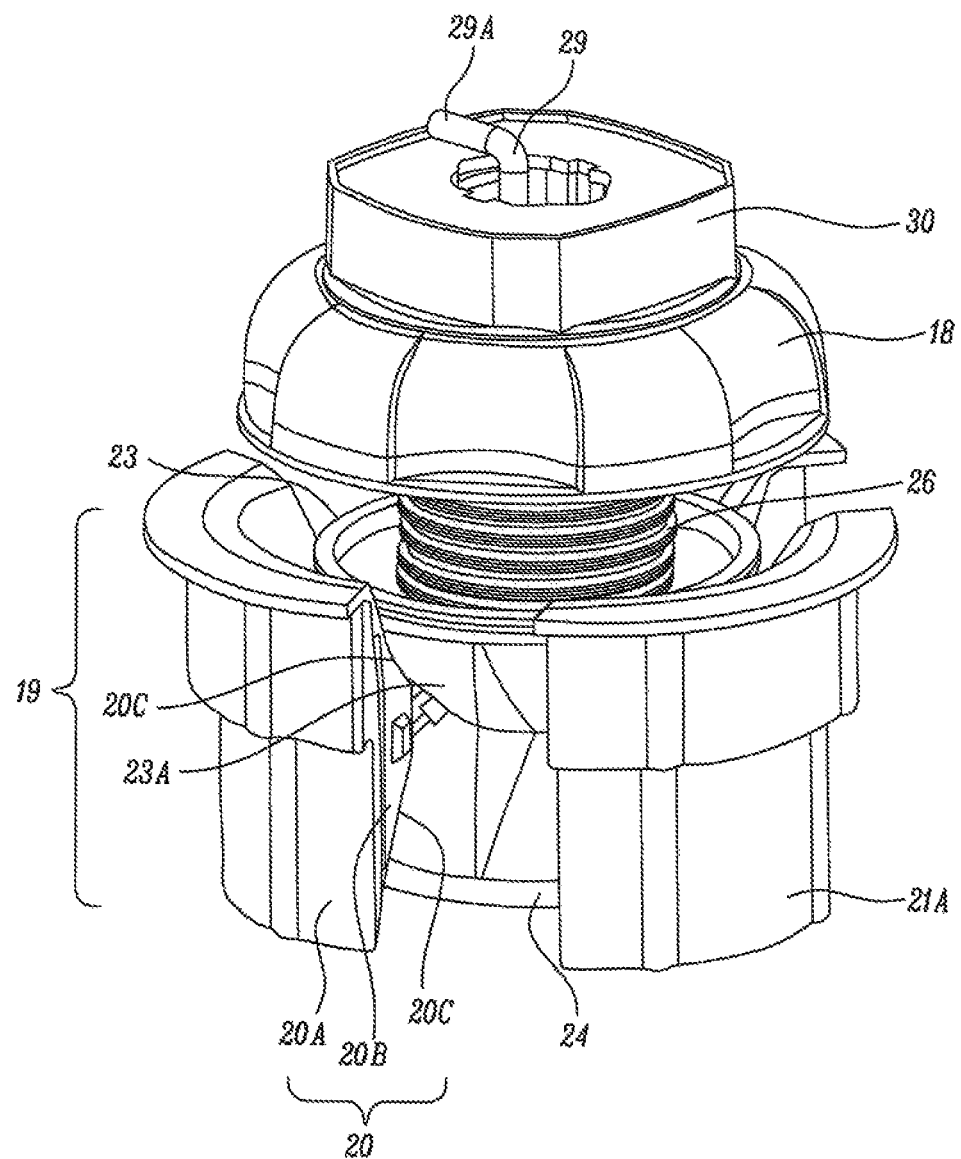
FIG. 15 shows a partial view (including base of neck assembly, rod, knob, threaded barrel, upper and lower elements of base assembly, and sub-elements of base assembly) of the apparatus, in an open position, shown in FIG. 1.
Figure 16:
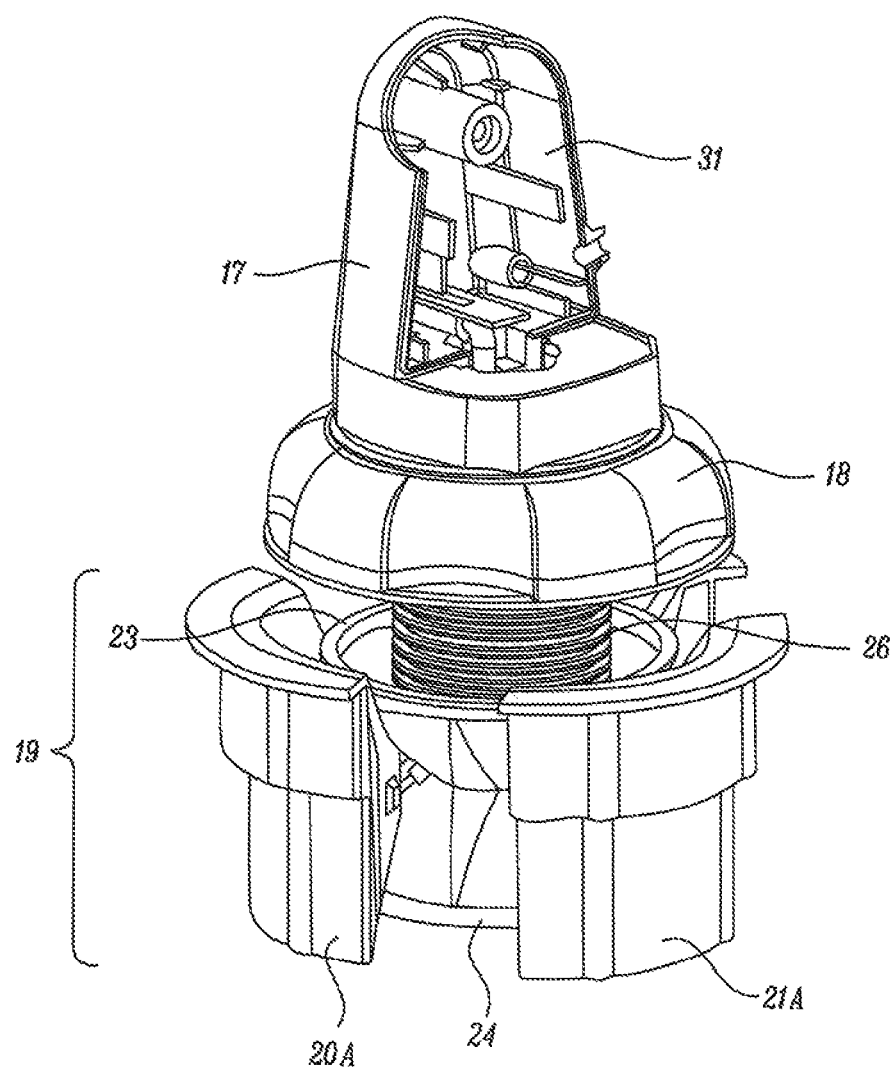
FIG. 16 shows a partial view (including base of neck assembly, neck assembly, housing of neck assembly, rod, knob, upper and lower elements of base assembly, and sub-elements of base assembly) of the apparatus shown in FIG. 1.

As shown in FIGS. 14-16, the rod 29 (e.g., made of, for example, metal or metal alloys) can extend from the first end 29A disposed above a top portion of the knob 18 to a second end 29B disposed at an under portion of the lower element 24. The rod 29 can be received through a slot which extends though a longitudinal axis of guide shaft 27, and can be disposed and configured to resist forces applied to the base assembly 19 when the knob 18 is rotated, thereby stabilizing the mount 11, to enable the mount 11 to reliably hold a mobile device upright even if a vehicle is, for example, off-roading in a bumpy environment. Each of the first end and the second ends 29A, 29B of the rod 29 can have a 90° angle bend. The bend of the first end 29A can hang over the neck base assembly 30, and the bend of the second end 29B can hang over the under portion of the lower element 24. A locking element 28 (shown as transparent in FIG. 14 to enable the second end 29B of the rod 29 to be visible) can be disposed at the under portion of the second conical element 24 and surround the second end of the rod 29, to securely lock the rod 29 in place. For example, the locking element 28 can constitute a cylindrically shaped portion disposed on a planar platform which surrounds the entirety of the opening at the under-side of the lower element 24 through which second end 29B extends.

Figure 17:
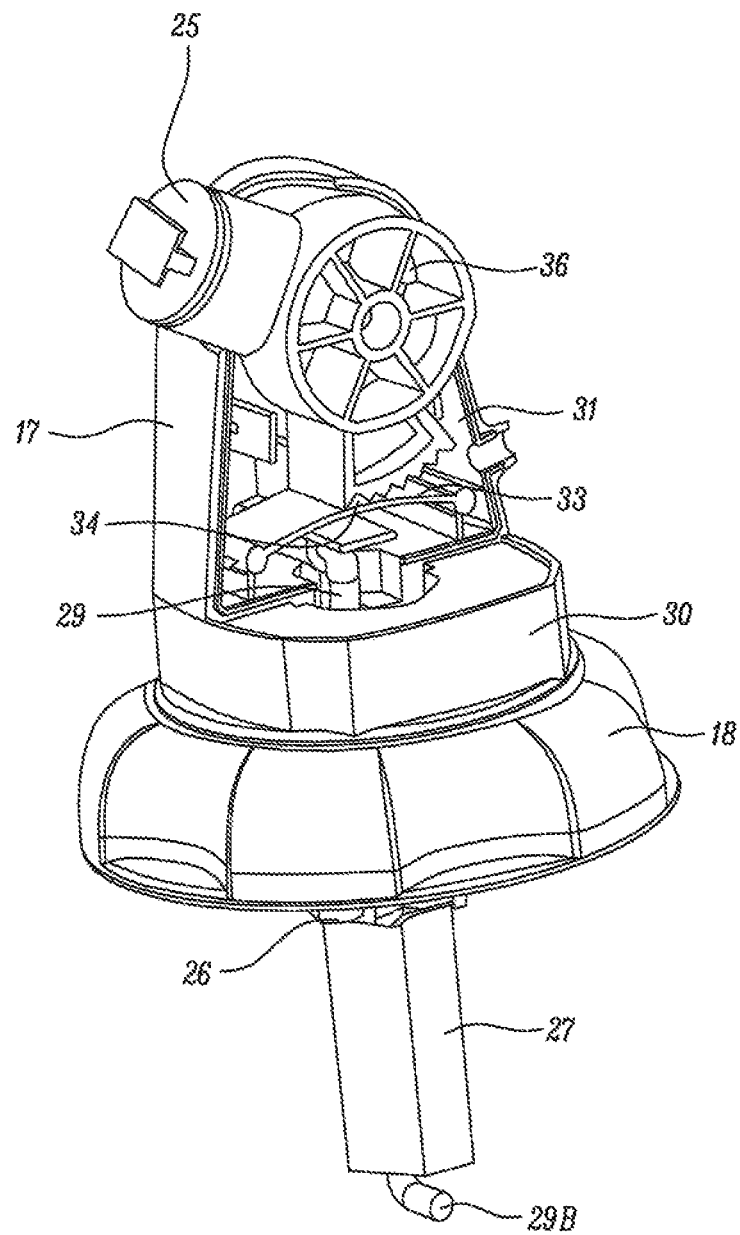
FIG. 17 shows a partial, internal view (including base of neck assembly, neck assembly, housing of neck assembly, pivot, connector, rod, knob, spring, tooth, threaded barrel, and guide shaft) of the apparatus shown in FIG. 1.

As shown in FIGS. 15-17, neck assembly 17 can include a rotatable base assembly 30 to enable the mobile device secured in the holder 12 to be rotated clockwise or counter-clockwise, and the a neck assembly 17 can include pivot 25 (FIG. 17) configured to enable the mobile device secured in the holder 12 to be rotated vertically and horizontally, and tilted up and down. The rotatable base assembly 30 can be disposed on top of the knob 18, and the pivot 25 can be connected to a back portion of the holder 12, opposite the resting portion 13. The neck assembly 17 can be configured to include a USB port, and neck housing 31 can include circuitry associated with the USB port, to enable the battery of the mobile device to be charged while secured in the mount 11. The neck assembly 17 may further include arm housing 31, to receive a first end 29A of rod 29, and connector part 36 for pivot 25 may be disposed in the arm housing 31.

The rotatable base assembly 30 of the neck assembly 17 can be disposed on top of the knob 18, and arm housing 31 can project upwards from the neck base assembly 30. As shown in FIG. 15, the arm housing 31 can include therein connector part 36, which can have a circular or rounded shape, and pivot 25 can be attached to an upper portion of the connector part 36. Axial rotation of pivot 25 may enable roll adjustment of the holder 12 (e.g., clockwise and counter-clockwise movement about a front-back axis), and a sector gear 32 can be attached to a lower portion of the connector part 36, and can be configured to cooperate with tooth 34 of spring 33 to allow for pitch adjustment of the holder 12 (e.g., rotation about a side-to-side axis), to optimize a viewing angle of a mobile device secured in the holder 12 in a cupholder of a vehicle.

Figure 18:
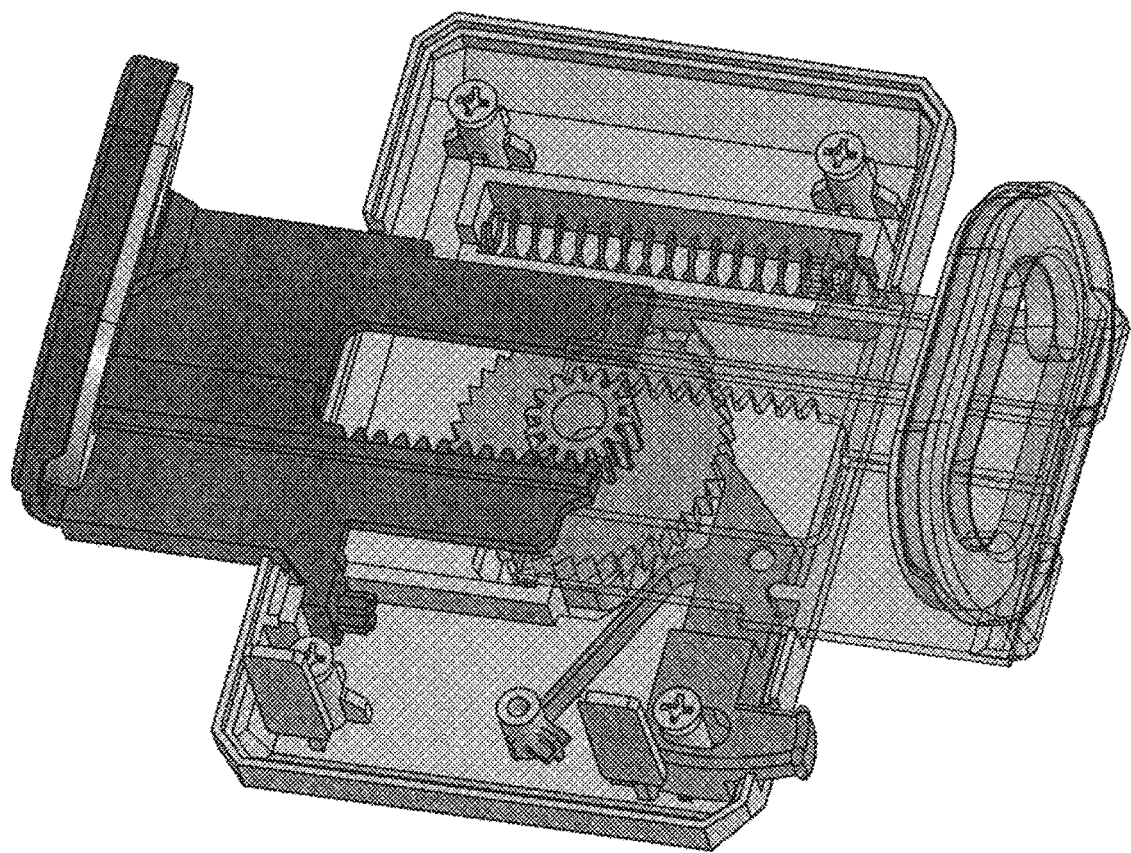
FIG. 18 shows an internal view (including first and second clamps, pawl, gripper spring, gear, racks, pinion and release button) of the holder assembly of the apparatus shown in FIG. 1.

As shown in FIG. 18, the holder 12 for a mobile device can include various mechanisms to grip and un-grip a mobile device. For example, a spring-loaded ratchet arrangement may be employed, in which release button 35 may be coupled to a spring which provides a return force when the release button 35 is actuated, and spring-loaded pawl 37 may be coupled to the release button 35 and include an end which engages with teeth of gear 39. Spring 37 can be coupled to side clamps 14, 15 to expand the side clamps 14, 15 (e.g., cause the side clamps 14, 15 to move away from each other). Side clamp 14 includes rack 40 to engage with pinion 42, and side clamp 15 includes rack 41 to engage with pinion 42, which can be fixed to gear 39 such that the pinion 42 and gear 39 rotate in unison. In operation, the spring-loaded ratchet arrangement can allow a user to push the side clamps 14, 15 towards each other to clamp the sides of a mobile device, and in such operation the racks 40, to engage with teeth of the pinion 42, rotating the pinion 42, and the gear 29, counter-clockwise. The pawl 37 can limit the ability of the user to manually expand the clamps, by restricting clockwise motion of the gear 39 (e.g., the pawl may be disposed to be stuck against a straighter side of the tooth of the gear 39, if the gear 29 is attempted to be rotated clockwise). When the release button 35 is activated, the pawl 37 may be disengaged from the teeth of gear 39, thereby enabling the gear 39 and pinion 42 to rotate in a clock-wise direction, and spring 37 can cause side clamps 14, 15 to move away from each other.

The aforementioned specific embodiments are illustrative, and many variations can be introduced without departing form the spirit of the disclosure or from the scope of the appended claims. Although various advantages in connection with this disclosure have been discussed, every embodiment need not include all of the advantages.

What is claimed is:

1. A mount for a mobile device, the mount being configured to be inserted in a cup holder, the mount comprising:
   a mobile device holder to hold the mobile device;
   a base assembly configured to be inserted into the cup holder, the base assembly comprising:
      plural curved sections, each curved section including an exterior surface forming a periphery of the base assembly and an interior surface;
      a first conical element including a sloped surface contacting an upper portion of the interior surface of the curved sections; and
      a second conical element opposing the first conical element and including a sloped surface contacting a lower portion of the interior surface of the curved sections;
   a neck assembly;
   a rotatable knob coupled to the mobile device holder via the neck assembly, the curved sections of the base assembly being configured to move away from each other when the knob is rotated in a first direction and move towards each other when the knob is rotated in a second direction, to adjust the diameter of the periphery of the base assembly and enable the base assembly to be inserted into cup holders of any of plural sizes; and
   a threaded barrel coupling the knob to the first conical element and configured to move upwards or downwards as the knob is rotated,
   wherein the rotation of the knob in the first direction causes the sloped surface of each of the first conical element and the second conical element to slide against respective sloped surfaces of the interior surface of the curved sections, as the first conical element and the second conical element move towards each other, to expand the diameter of the periphery of the base assembly.

2. The mount according to claim 1,
   wherein the rotation of the knob in the second direction causes the sloped surface of each of the first conical element and the second conical element to slide against respective sloped surfaces of the interior surface of the curved sections, as the first conical element and the second conical element move away from each other, to narrow the diameter of the periphery of the base assembly.

3. The mount according to claim 1, further comprising:
a guide shaft coupled to the threaded barrel and extending from above a top portion of the knob to the second conical element, the guide shaft being configured to prevent the threaded barrel from rotating when the knob is rotated, and to guide and hold the second conical element when the knob is rotated.

4. The mount according to claim 1, further comprising:
a rod extending from a first end disposed above a top portion of the knob to a second end disposed at an under portion of the second conical element, the rod being configured to resist forces applied to the base assembly when the knob is rotated, each of the first end and the second end of the rod having a 90° bend; and
a locking element disposed at the under portion of the second conical element and surrounding the second end of the rod, to securely lock the rod in place.

5. The mount according to claim 4, wherein
the first end of the rod is disposed in a housing of the neck assembly.

6. The mount according to claim 1, wherein the neck assembly includes a pivot coupled to a back portion of the holder to enable roll adjustment of the mobile device holder.

7. The mount according to claim 6, wherein a connector part of the neck assembly comprises the pivot and a sector gear, the sector gear cooperating with a tooth portion of a spring included in the neck assembly to enable pitch adjustment of the mobile device holder.

8. The mount according to claim 1, wherein the mobile device holder includes a resting portion to receive the mobile device, and first and second side clamps configured to clamp first and second sides of the mobile device, respectively, the first and second side clamps being movable towards and away from the resting portion to securely hold mobile devices of any of plural sizes, and a release button which when actuated causes the first and second side clamps to move away from each other to release the mobile device from the mobile device holder.

9. The mount according to claim 8, wherein the mobile device holder includes a first spring which causes the first and second side clamps to move away from each other when the release button is activated.

10. The mount according to claim 8, wherein the mobile device holder further comprises a gear and a pinion which cooperates with the release button, and each of the first and second clamps include a rack portion which cooperates with the pinion to enable the first and second clamps to move towards or away from each other.

11. A mount for a mobile device, the mount being configured to be inserted in a cup holder, the mount comprising:
a mobile device holder to hold the mobile device;
a base assembly configured to be inserted into the cup holder, the base assembly comprising:
plural curved sections, each curved section including an exterior surface forming a periphery of the base assembly and an interior surface;
a first element including a first surface complementary to an upper portion of the interior surface of the curved sections; and
a second element opposing the first element and including a second surface complementary to a lower portion of the interior surface of the curved sections;
a neck assembly;
a rotatable knob coupled to the mobile device holder via the neck assembly, the curved sections of the base assembly being configured to move away from each other when the knob is rotated in a first direction and move towards each other when the knob is rotated in a second direction, to adjust the diameter of the periphery of the base assembly and enable the base assembly to be inserted into cup holders of any of plural sizes;
a threaded barrel coupling the knob to the first element and configured to move upwards or downwards as the knob is rotated, wherein the rotation of the knob in the first direction causes the first surface of the first element to slide against the complementary surface of the upper portion of the interior surface of the curved section and causes the second surface of the second element to slide against the complementary surface of the lower portion of the interior surface of the curved section, as the first element and the second element move towards each other, to expand the diameter of the periphery of the base assembly; and
a guide shaft coupled to the threaded barrel and extending from a top portion of the knob to a bottom portion of the second element, the guide shaft being configured to prevent the threaded barrel from rotating when the knob is rotated and to guide and hold the second element when the knob is rotated.

12. A mount for a mobile device, the mount being configured to be inserted in a cup holder, the mount comprising:
a mobile device holder to hold the mobile device;
a base assembly configured to be inserted into the cup holder, the base assembly comprising:
plural curved sections, each curved section including an exterior surface forming a periphery of the base assembly and interior surface;
a first element including a first surface complementary to an upper portion of the interior surface of the curved sections; and
a second element opposing the first element and including a second surface complementary to a lower portion of the interior surface of the curved sections;
a neck assembly;
a rotatable knob coupled to the mobile device holder via the neck assembly, the curved sections of the base assembly being configured to move away from each other when the knob is rotated in a first direction and move towards each other when the knob is rotated in a second direction, to adjust the diameter of the periphery of the base assembly and enable the base assembly to be inserted into cup holders of any of plural sizes;
a threaded barrel coupling the knob to the first element and configured to move upwards or downwards as the knob is rotated, wherein the rotation of the knob in the first direction causes the first surface of the first element to slide against the complementary surface of the upper portion of the interior surface of the curved section and causes the second surface of the second element to slide against the complementary surface of the lower portion of the interior surface of the curved section, as the first element and the second element move towards each other, to expand the diameter of the periphery of the base assembly;
a rod extending from a first end disposed above a top portion of the knob to a second end disposed at an under portion of the second element, the rod being disposed and configured to resist forces applied to the base assembly when the knob is rotated, each of the first end and the second end of the rod having a 90° angle bend; and a locking element disposed at the under portion of the second element and surrounding the second end of the rod, to securely lock the rod in place.

13. The mount according to claim 12, wherein the first end of the rod is disposed in a housing of the neck assembly.

* * * * *